(12) United States Patent
Shin et al.

(10) Patent No.: US 12,656,568 B2
(45) Date of Patent: Jun. 16, 2026

(54) CAMERA MODULE

(71) Applicant: Samsung Electro-Mechanics Co., Ltd., Suwon-si (KR)

(72) Inventors: Jun Sup Shin, Suwon-si (KR); Chuel Jin Park, Suwon-si (KR); Young Bok Yoon, Suwon-si (KR); Bo Sung Seo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 517 days.

(21) Appl. No.: 18/079,310

(22) Filed: Dec. 12, 2022

(65) Prior Publication Data

US 2023/0194824 A1 Jun. 22, 2023

(30) Foreign Application Priority Data

Dec. 17, 2021 (KR) ........................ 10-2021-0181890
Nov. 23, 2022 (KR) ........................ 10-2022-0158729

(51) Int. Cl.
*G02B 7/02* (2021.01)
*G02B 27/64* (2006.01)
(Continued)

(52) U.S. Cl.
CPC ........... *G02B 7/021* (2013.01); *G02B 27/646* (2013.01); *G03B 5/00* (2013.01); *H02K 41/0354* (2013.01);
(Continued)

(58) Field of Classification Search
CPC . G02B 7/021; G02B 7/08; G02B 7/09; G02B 7/10; G02B 9/62; G02B 13/001;
(Continued)

(56) References Cited

U.S. PATENT DOCUMENTS

2015/0070765 A1 3/2015 Lam
2017/0230552 A1* 8/2017 Eromäki ................ H04N 23/51
(Continued)

FOREIGN PATENT DOCUMENTS

CN 104459926 A 3/2015
CN 112333351 A 2/2021
(Continued)

OTHER PUBLICATIONS

Korean Office Action issued on Jan. 17, 2025 in corresponding Korean Patent Application No. 10-2022-0158729. (5pages in English, 4pages in Korean).
(Continued)

*Primary Examiner* — Marin Pichler
(74) *Attorney, Agent, or Firm* — NSIP Law

(57) ABSTRACT

A camera module includes a housing having an inner space; a carrier, disposed in the inner space, configured to move relative to the housing in an optical axis direction; a lens module accommodated in the carrier; a guide housing coupled with the housing; a lifting guide rotatable with respect to the guide housing; a lifting member configured to move in the optical axis direction as the lifting guide is rotated to be in contact with or spaced apart from the lens module; and a driving unit configured to transmit a driving force to the lifting guide. A protrusion part is disposed on one of the lifting guide and the driving unit, and a guide groove coupled to the protrusion part is disposed in another of the lifting guide and the driving unit.

18 Claims, 19 Drawing Sheets

(51) Int. Cl.

| | | |
|---|---|---|
| *G03B 5/00* | (2021.01) | |
| *H02K 41/035* | (2006.01) | |
| *G03B 13/36* | (2021.01) | |

(52) U.S. Cl.
CPC ...... *G03B 13/36* (2013.01); *G03B 2205/0007* (2013.01); *G03B 2205/0069* (2013.01)

(58) Field of Classification Search
CPC .............. G02B 13/0065; G02B 27/646; H04N 5/2253; H04N 5/2254; H04N 5/2257; H04N 5/23287; G03B 2205/00; G03B 2205/0007; G03B 2205/0053; G03B 2205/0069; G03B 3/02; G03B 3/10; G03B 5/00; G03B 5/04; G03B 13/36; G03B 30/00; G03B 2205/0038; H02K 11/21; H02K 11/33; H02K 41/0354; H02K 41/0356
USPC ....... 359/911, 554, 555, 557, 811, 813, 814, 359/824, 872, 877; 396/52, 55
See application file for complete search history.

(56) References Cited

U.S. PATENT DOCUMENTS

| | | | |
|---|---|---|---|
| 2021/0247589 A1 | 8/2021 | Ito et al. | |
| 2022/0146910 A1 | 5/2022 | Li et al. | |
| 2023/0194960 A1* | 6/2023 | Yedid ..................... | G03B 30/00 |

FOREIGN PATENT DOCUMENTS

| | | |
|---|---|---|
| CN | 112689075 A | 4/2021 |
| CN | 113168077 A | 7/2021 |
| JP | 2018-124396 A | 8/2018 |
| JP | 6525812 B2 | 6/2019 |
| KR | 10-2021-0054582 A | 5/2021 |
| WO | WO 2021/059097 A2 | 4/2021 |

OTHER PUBLICATIONS

Chinese Office Action issued on Jul. 4, 2025 in corresponding Chinese Patent Application No. 202211621944.1. (5 pages in English and 8 pages in Chinese).

* cited by examiner

I-I'

20

CAMERA MODULE

CROSS-REFERENCE TO RELATED APPLICATION(S)

This application claims the benefit under 35 USC 119(a) of Korean Patent Application No. 10-2021-0181890 filed on Dec. 17, 2021 and Korean Patent Application No. 10-2022-0158729 filed on Nov. 23, 2022 in the Korean Intellectual Property Office, the entire disclosures of which are incorporated herein by reference for all purposes.

BACKGROUND

1. Field

The following disclosure relates to a camera module.

2. Description of Related Art

In recent years, a camera module has been used in portable electronic devices such as tablets, personal computers (PC), laptop computers, and the like, as well as a smartphone.

In order to capture a high-resolution image, the camera module is provided with a gradually increasing number of lenses included in an optical system, as well as an actuator for performing autofocusing and optical image stabilization.

As such, it is difficult to miniaturize recent camera modules because it requires various components for improved performance, even as portable electronic devices, including the camera modules, tend to be slimmer.

Accordingly, there is a problem that the camera module is always mounted protruding from the portable electronic device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing having an inner space; a carrier, disposed in the inner space, configured to move relative to the housing in an optical axis direction; a lens module accommodated in the carrier; a guide housing coupled with the housing; a lifting guide rotatable with respect to the guide housing; a lifting member configured to move in the optical axis direction as the lifting guide is rotated to be in contact with or spaced apart from the lens module; and a driving unit configured to transmit a driving force to the lifting guide. A protrusion part is disposed on one of the lifting guide and the driving unit, and a guide groove coupled to the protrusion part is disposed in another of the lifting guide and the driving unit.

The driving unit may include a motor, a shaft extending from the motor, and a guide member movable along the shaft. The guide groove may be disposed in the guide member.

The lifting guide may include a guide hole inclined with respect to the optical axis direction, and the lifting member may include a guide protrusion disposed in the guide hole.

The guide groove extending in the optical axis direction may be disposed in an inner surface of the guide housing, and the guide protrusion may pass through the guide hole to be disposed in the guide groove.

The lifting guide may include a support protrusion extending in a direction perpendicular to the optical axis direction. The guide housing may include a seating part in which the support protrusion is seated. The seating part may be formed as a groove along a circumference of the lifting guide with open upper and one side surfaces.

The camera module may further include a sealing member coupled with the guide housing to seal an open top of the guide housing. The sealing member may be made of a material having elasticity.

The sealing member may have a hollow part. A cover glass sealing the hollow part may be coupled to the sealing member. The sealing member may include a bent part deformed as the lifting member is moved.

The lens module may include a lens unit including at least one lens. A guide holder may be configured to guide and move the lens unit in the optical axis direction. As the lifting member is moved downward in the optical axis direction, the lens unit may be pressed by the lifting member and moved downward relative to the guide holder in the optical axis direction.

One of the lens unit and the guide holder may include a protrusion part protruding in a direction perpendicular to the optical axis direction, and another of the lens unit and the guide holder may include a guide groove part extending in the optical axis direction and in which the protrusion part is disposed.

An upper end of the protrusion part may include a convex curved surface, and an upper end of the guide groove part may have a '$\wedge$' shape.

The lens unit may include a lens barrel accommodating at least one lens and a lens holder coupled with the lens barrel. The lens holder may include an extension part extending toward the lifting member in the optical axis direction. The lifting member may include a pressure protrusion protruding toward the lens holder in the optical axis direction.

The lens module may further include an elastic member elastically supporting the lens unit.

The lens unit may further include an optical image stabilization (OIS) frame to which the guide holder is coupled. The elastic member may have one side coupled to the OIS frame and another side coupled to the lens unit.

The OIS frame may be accommodated in the carrier, and the lens unit may be movable relative to the carrier in a direction perpendicular to the optical axis direction.

A guide frame may be disposed between the OIS frame and the carrier, a plurality of first ball members may be disposed between the carrier and the guide frame, and a plurality of second ball members may be disposed between the guide frame and the OIS frame.

The camera module may further include a first driving unit including a first magnet disposed on the carrier and a first coil disposed to face the first magnet, and a second driving unit including second and third magnets disposed in the OIS frame, a second coil disposed to face the second magnet, and a third coil disposed to face the third magnet.

In another general aspect, a mobile device includes a camera module. The camera module includes a housing having an inner space; a carrier, disposed in the inner space, configured to move relative to the housing in a first direction; a lens module accommodated in the carrier; a guide housing coupled with the housing; a lifting guide configured to move in a second direction with respect to the guide housing; a lifting member configured to move in the first direction, perpendicular to the second direction, along with a movement of the lifting guide in the second direction; and a driving unit, coupled to drive the lifting guide, configured to drive the lifting guide. The driving unit includes a protrusion part disposed on one of the lifting guide and the driving unit, and a guide groove coupled to the protrusion part and disposed in another of the lifting guide and the driving unit.

The lifting guide may be further configured to rotate in a second direction with respect to the guide housing, and the first direction is in an optical axis direction.

Other features and aspects will be apparent from the following detailed description, the drawings, and the claims.

BRIEF DESCRIPTION OF DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1A:
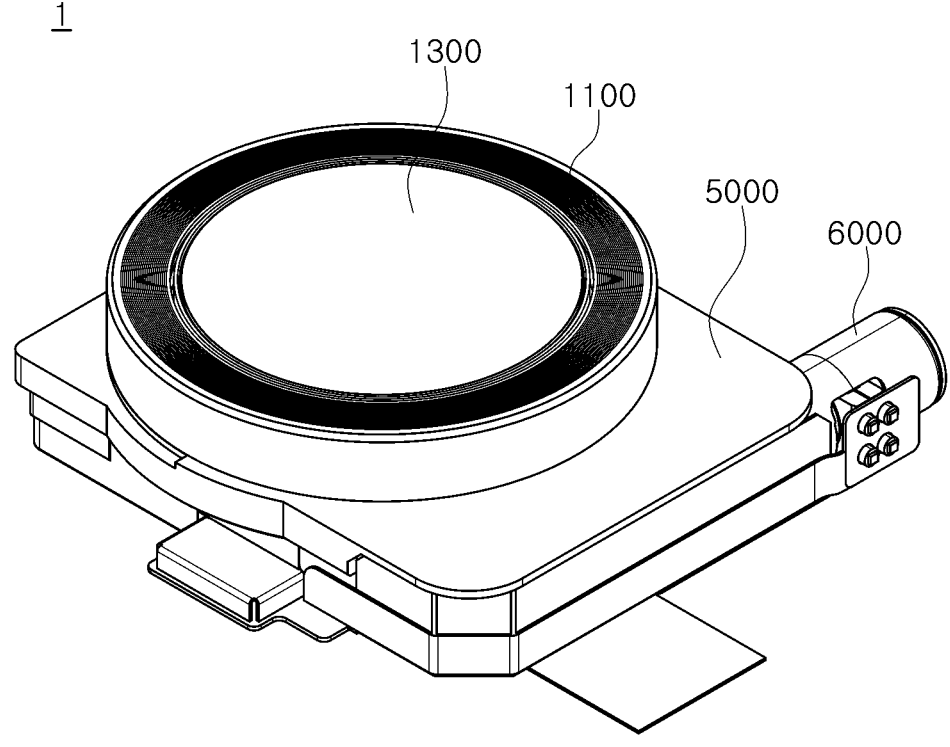
FIGS. 1A and 1B are perspective views, each showing a state where a camera module is popped in according to one or more embodiments of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The present disclosure relates to a camera module, which may be included in a portable electronic device such as a mobile communications terminal, a smartphone, a tablet personal computer (PC), or the like.

Figure 1B:
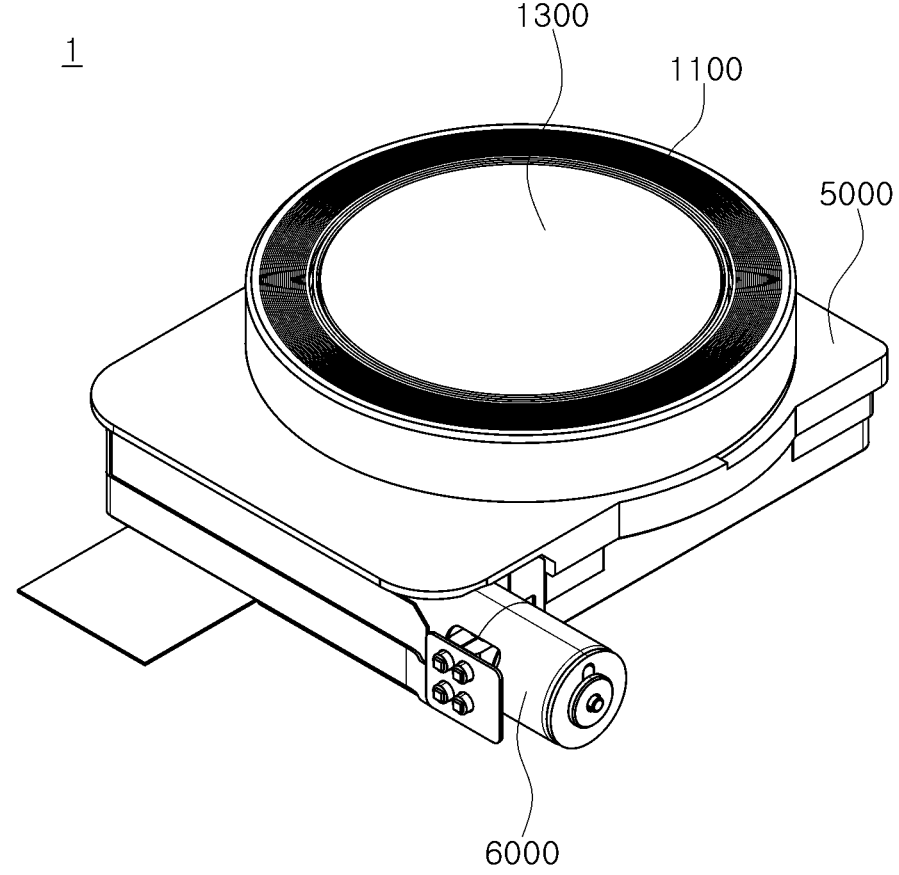
Figure 2:
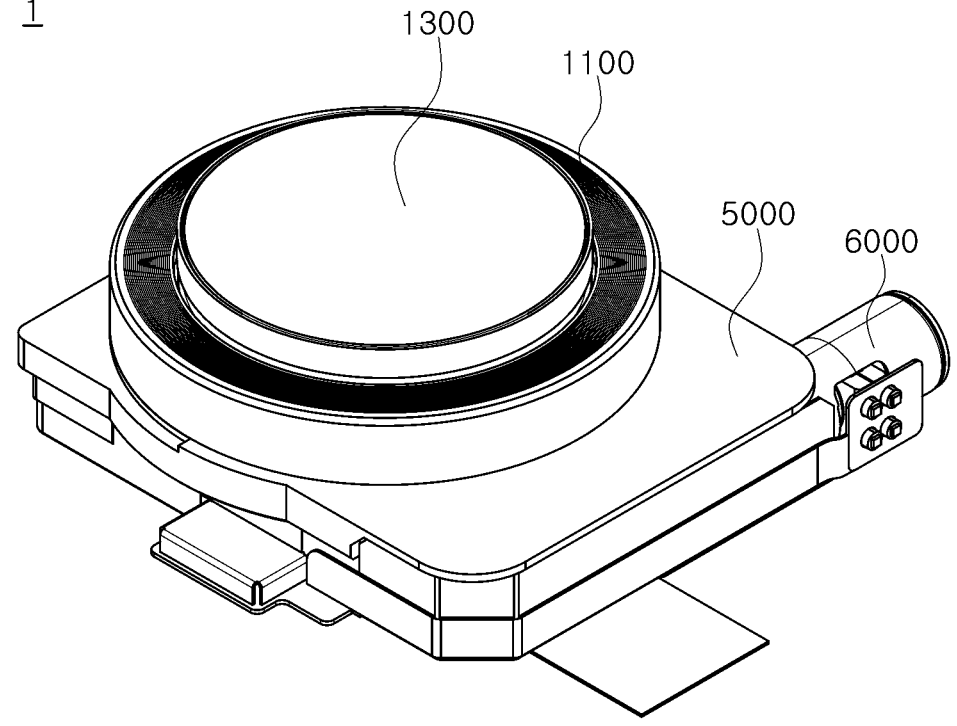
FIG. 2 is a perspective view showing a state where the camera module is popped out according to one or more embodiments of present disclosure.

FIGS. 1A and 1B are perspective views, each showing a state where the camera module is popped in according to one or more embodiments of the present disclosure, and FIG. 2 is a perspective view showing a state where the camera module is popped out according to one or more embodiments of present disclosure.

Figure 3:
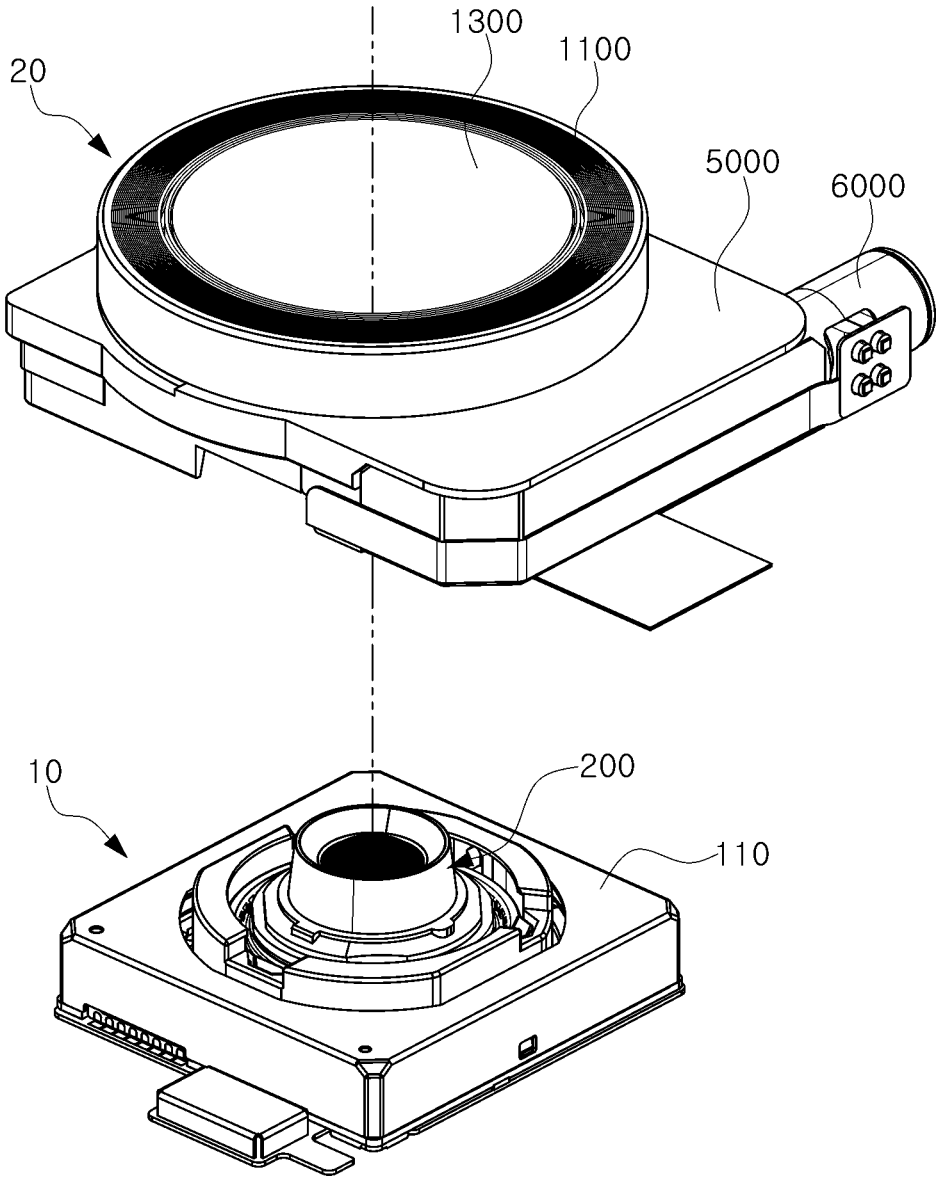
FIG. 3 is an exploded perspective view showing a state where a pop-out module and a camera actuator are separated from the camera module according to one or more embodiments of present disclosure.

In addition, FIG. 3 is an exploded perspective view showing a state where a pop-out module and a camera actuator are separated from the camera module according to one or more embodiments of the present disclosure.

A camera module 1, according to one or more embodiments of the present disclosure, may include a camera actuator 10 and a pop-out module 20.

The camera actuator 10 may include a housing 110 having an inner space and a lens barrel 220 disposed in the housing 110. The lens barrel 220 may change position in an optical axis (Z-axis) direction by the pop-out module 20.

For example, when the camera module 1 is not in use, the lens barrel 220 may be moved downward in the optical axis (Z-axis) direction (or toward an image sensor 710) to minimize a level in which the lens barrel 220 protrudes outward from the housing 110.

On the other hand, when the camera module 1 is in use, the lens barrel 220 may be moved upward in the optical axis (Z-axis) direction (or toward a subject) to capture the subject.

The recent camera module has difficulty in reducing its size because the camera module requires various components for improved performance, and accordingly, there is a problem that the camera module is always mounted protruding from the portable electronic device.

However, the camera module 1, according to one or more embodiments of the present disclosure, may solve the problem of the camera module 1 protruding from the portable electronic device by moving the position of the lens barrel 220 based on whether the camera module 1 is in use.

Figure 4:
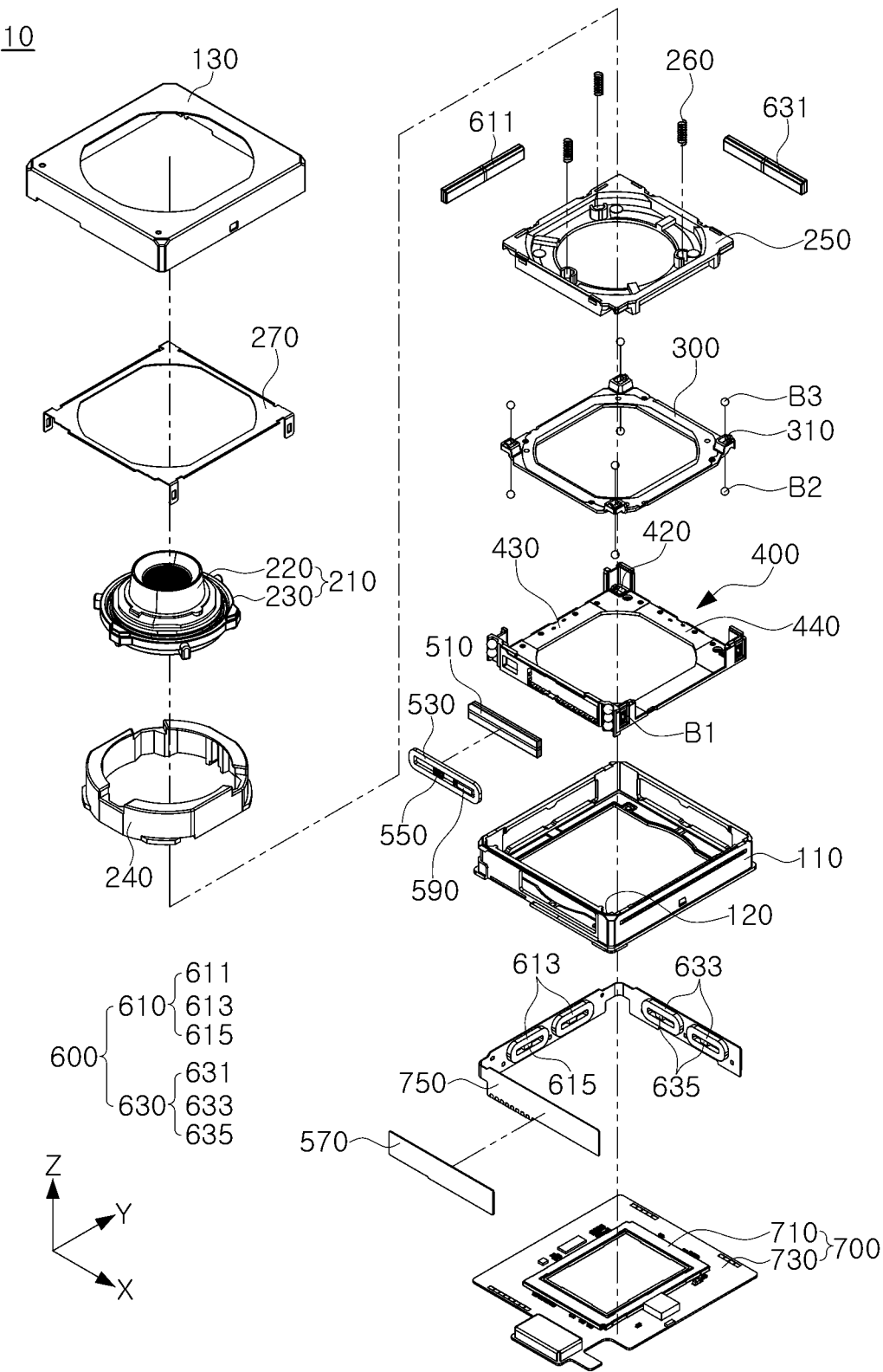
FIG. 4 is a schematic exploded perspective view of the camera actuator according to one or more embodiments of present disclosure.
Figure 5:
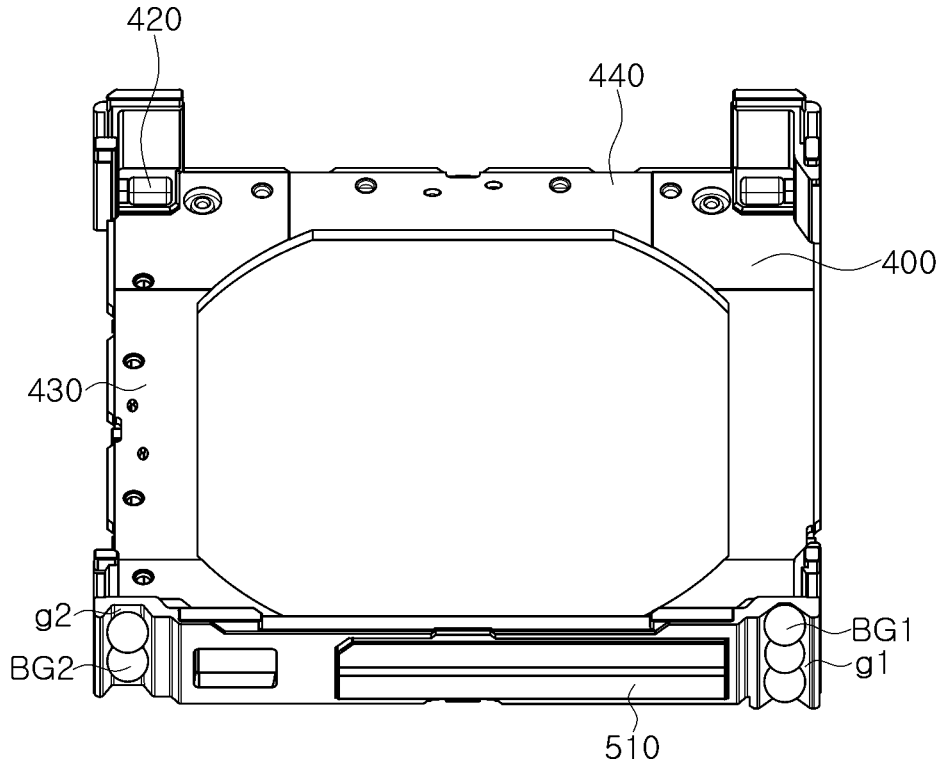
FIG. 5 is a perspective view of a carrier of the camera actuator.
Figure 6:
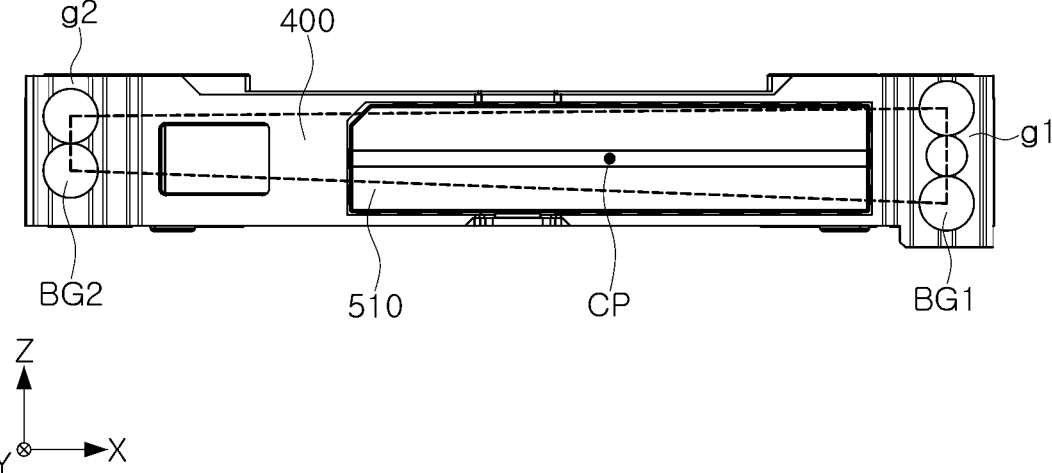
FIG. 6 is a side view of the carrier of the camera actuator.

FIG. 4 is a schematic exploded perspective view of the camera actuator according to one or more embodiments of present disclosure, FIG. 5 is a perspective view of a carrier of the camera actuator, and FIG. 6 is a side view of the carrier of the camera actuator.

Figure 7:
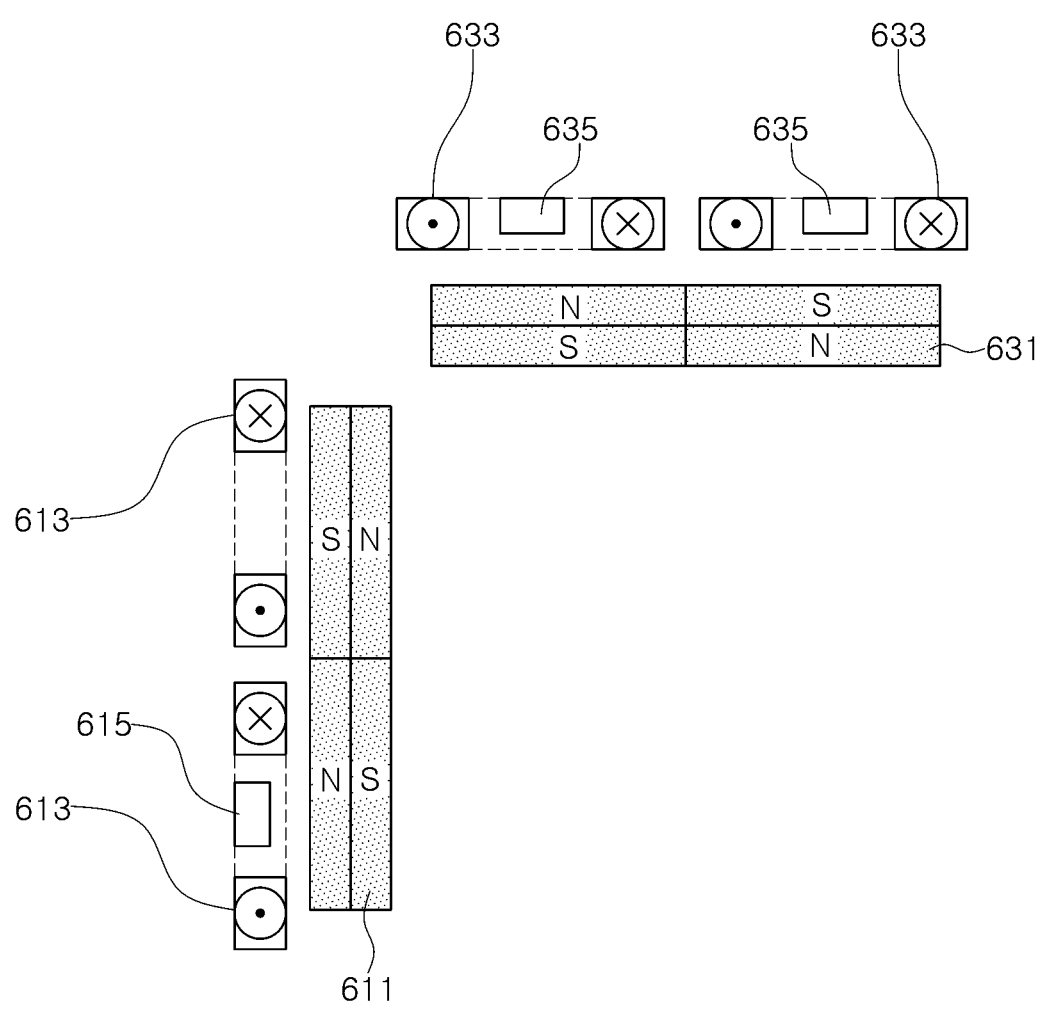
FIG. 7 is a view schematically showing a disposition of a second driving unit of the camera actuator.

In addition, FIG. 7 is a view schematically showing a disposition of a second driving unit of the camera actuator.

Referring to FIGS. 4 through 7, the camera actuator 10, according to one or more embodiments of the present disclosure, may include a lens module 200 and the housing 110 accommodating the lens module 200.

In addition, the camera actuator 10 may further include a guide frame 300, a carrier 400, the housing 110, the image sensor module 700, and a case 130.

The carrier 400 may be disposed in the housing 110 and moved relative to the housing 110 in the optical axis (Z-axis) direction.

The lens module 200 may be disposed in the carrier 400, and the carrier 400 and the lens module 200 may be moved together in the optical axis (Z-axis) direction. A distance between the lens module 200 and the image sensor 710 may thus be changed to perform autofocusing.

In addition, the guide frame 300 may be disposed between the carrier 400 and the lens module 200. The guide frame 300 may function to guide the lens module 200 to be moved in a direction perpendicular to the optical axis (Z-axis) direction.

The lens module 200 may be moved perpendicular to the optical axis (Z-axis) direction to perform optical image stabilization while capturing the subject.

The lens module 200 may include a lens unit 210, a guide holder 240, and an optical image stabilization (OIS) frame 250. In addition, the lens unit 210 may include the lens barrel 220 and a lens holder 230.

The lens module 200 may be accommodated in the housing 110. For example, the housing 110 may have an open top and bottom, the carrier 400 may be disposed in the inner space of the housing 110, and the lens module 200 may be accommodated in the carrier 400.

The lens barrel 220 may have a hollow cylindrical shape, and at least one lens for capturing the subject may be accommodated in the lens barrel 220. When the plurality of lenses are arranged, the plurality of lenses may be mounted in the lens barrel 220 along an optical axis (Z-axis). The lens barrel 220 may be coupled with the lens holder 230. Accordingly, the lens barrel 220 and the lens holder 230 may be moved together.

The lens unit 210 may be coupled to the guide holder 240 to be movable in the optical axis (Z-axis) direction. In addition, the guide holder 240 may be coupled to the OIS frame 250.

The lens unit 210 may be moved relative to the guide holder 240 in the optical axis (Z-axis) direction. This configuration is to adjust the position of the lens unit 210 based on whether the camera module 1 is in use. A description thereof will be provided below with reference to FIGS. 8 through 10.

The camera actuator 10 may perform the autofocusing by moving the lens module 200 in the optical axis (Z-axis) direction, and perform the optical image stabilization by moving the lens module 200 in directions perpendicular to the optical axis (Z-axis).

The camera actuator may include a first driving unit 500 moving the lens module 200 in the optical axis (Z-axis) direction, and a second driving unit 600 moving the lens module 200 in directions perpendicular to the optical axis (Z-axis) direction.

The image sensor module 700 may be a device converting light incident thereto through the lens module 200 into an electrical signal.

For example, the image sensor module 700 may include an image sensor 710 and a printed circuit board 730 connected to the image sensor 710, and may further include an infrared filter.

The infrared filter may serve to cut off light in an infrared area in light incident thereto through the lens module 200.

The image sensor 710 may convert light incident thereto through the lens module 200 into the electrical signal. For example, the image sensor 710 may be a charge-coupled device (CCD) or a complementary metal-oxide semiconductor (CMOS).

The electrical signal converted by the image sensor 710 may be output as an image through a display unit of the portable electronic device.

The image sensor 710 may be fixed to the printed circuit board 730, and electrically connected to the printed circuit board 730 by wire bonding.

The image sensor module 700 may be disposed under the housing 110.

The case 130 may be coupled to the housing 110 to surround the outer surfaces of the housing 110, and function to protect the internal components of the camera actuator 10.

The first driving unit 500 may move the lens module 200 to focus on the subject. For example, the first driving unit 500 may generate a driving force in the optical axis (Z-axis) direction to move the carrier 400. The lens module 200 may be disposed in the carrier 400, and the carrier 400 and the lens module 200 may be moved together in the optical axis (Z-axis) direction by the driving force of the first driving unit 500.

The first driving unit 500 may include a first magnet 510 and a first coil 530. The first magnet 510 and the first coil 530 may be disposed to face each other in the direction perpendicular to the optical axis (Z-axis).

The first magnet 510 may be mounted on the carrier 400. For example, the first magnet 510 may be mounted on one surface of the carrier 400.

The first magnet 510 may be magnetized so that one surface (e.g., a surface facing the first coil 530) thereof has both an N pole and an S pole. For example, the N pole, a neutral area, and the S pole may be sequentially positioned on one surface of the first magnet 510, facing the first coil 530, in the optical axis (Z-axis) direction.

The other surface (e.g., a surface opposite to one surface) of the first magnet 510 may be magnetized to have both the S pole and the N pole. For example, the S pole, the neutral area, and the N pole may be sequentially positioned on the other surface of the first magnet 510 in the optical axis (Z-axis) direction.

The first coil 530 may be disposed to face the first magnet 510. For example, the first coil 530 may be disposed to face the first magnet 510 in the direction perpendicular to the optical axis (Z-axis).

The first coil 530 may be disposed on a substrate 750, and the substrate 750 may be mounted in the housing so that the first magnet 510 and the first coil 530 face each other in the direction perpendicular to the optical axis (Z-axis). For example, the first coil 530 may be disposed on one surface of the substrate 750. The substrate 750 may be mounted on a side surface of the housing 110 so that the first magnet 510 and the first coil 530 face each other in the direction perpendicular to the optical axis (Z-axis).

The housing 110 may include an opening, and the first coil 530 disposed on the substrate 750 may directly face the first magnet 510 through the opening.

The first magnet 510 may be a moving member mounted on the carrier 400 to be moved together with the carrier 400 in the optical axis (Z-axis) direction, and the first coil 530 may be a fixed member fixed to the substrate 750.

When power is applied to the first coil 530, the carrier 400 may move in the optical axis (Z-axis) direction by an electromagnetic force generated between the first magnet 510 and the first coil 530.

The lens module 200 may be accommodated in the carrier 400, and the lens module 200 may thus also be moved in the optical axis (Z-axis) direction as the carrier 400 is moved. As described below with reference to FIG. 4, the guide frame 300 and the lens module 200 are sequentially accommodated in the carrier 400, and the guide frame 300 and the lens module 200 may thus also be moved in the optical axis (Z-axis) direction as the carrier 400 is moved.

A first ball member B1 may be disposed between the carrier 400 and the housing 110. For example, the first ball member B1 may be disposed between the carrier 400 and the housing 110 to reduce friction when the carrier 400 is moved.

The first ball member B1 may include a plurality of balls disposed in the optical axis (Z-axis) direction. The plurality of balls may roll in the optical axis (Z-axis) direction when the carrier 400 is moved in the optical axis (Z-axis) direction.

A first yoke 570 may be disposed in the housing 110. The first yoke 570 may be disposed to face the first magnet 510. For example, the first coil 530 may be disposed on one surface of the substrate 750, and the first yoke 570 may be disposed on the other surface of the substrate 750.

The first magnet 510 and the first yoke 570 may generate an attractive force between each other. For example, the first yoke 570 may be made of a magnetic material. The attractive force may act in the direction perpendicular to the optical axis (Z-axis) between the first magnet 510 and the first yoke 570.

The first ball member B1 may respectively be in contact with the carrier 400 and the housing 110 by the attractive force generated between the first magnet 510 and the first yoke 570.

Guide grooves may be disposed in surfaces of the carrier 400 and the housing 110, facing each other. For example, the carrier 400 may include a first guide groove 410 and the housing 110 may include a second guide groove 120.

The first guide groove 410 and the second guide groove 120 may each extend in the optical axis (Z-axis) direction. The first ball member B1 may be disposed between the first guide groove 410 and the second guide groove 120.

The first guide groove 410 may include a first groove g1, and a second groove g2, and the second guide groove 120 may include a third groove g3 and a fourth groove g4. Each groove may be long in the optical axis (Z-axis) direction.

The first groove g1 and the third groove g3 may be disposed to face each other in the direction perpendicular to the optical axis (Z-axis) direction, and some of the plurality of balls included in the first ball member B1 (e.g., first ball group BG1 described below) may be disposed in a space between the first groove g1 and the third groove g3.

Among the plurality of balls included in the first ball group BG1, the balls positioned at the outermost side in a direction parallel to the optical axis (Z-axis) may respectively be in two-point contact with the first groove g1 and the third groove g3.

That is, among the plurality of balls included in the first ball group BG1, the balls positioned at the outermost side in the direction parallel to the optical axis (Z-axis) may be in two-point contact with the first groove g1, and may be in two-point contact with the third groove g3, respectively.

The first ball group BG1, the first groove g1, and the third groove g3 may function as a main guide for guiding the movement of the carrier 400 in the optical axis (Z-axis) direction.

The second groove g2 and the fourth groove g4 may be disposed to face each other in the direction perpendicular to the optical axis (Z-axis) direction, and some of the plurality of balls included in the first ball member B1 (e.g., second ball group BG2 described below) may be disposed in a space between the second groove g2 and the fourth groove g4.

Among the plurality of balls included in the second ball group BG2, the balls positioned at the outermost side in the direction parallel to the optical axis (Z-axis) may be in two-point contact with one of the second groove g2 and the fourth groove g4, and may be in one-point contact with the other one.

For example, among the plurality of balls included in the second ball group BG2, the balls positioned at the outermost side in the direction parallel to the optical axis (Z-axis) may be in one-point contact with the second groove g2 and may be in two-point contact with the fourth groove g4 (, and vice versa).

The second ball group BG2, the second groove g2, and the fourth groove g4 may function as an auxiliary guide for supporting the movement of the carrier 400 in the optical axis (Z-axis) direction.

The first ball member B1 may include the first ball group BG1 and the second ball group BG2, and the first ball group BG1 and the second ball group BG2 may each include the plurality of balls disposed in the optical axis (Z-axis) direction.

The first ball group BG1 and the second ball group BG2 may be spaced apart from each other in the direction (e.g., X-axis direction) perpendicular to the optical axis (Z-axis). The number of balls included in the first ball group BG1 and the number of balls included in the second ball group BG2 may differ (see FIG. 6).

For example, the first ball group BG1 may include three or more balls arranged in the optical axis (Z-axis) direction, and the second ball group BG2 may include the balls whose number is smaller than the number of balls included in the first ball group BG1.

The number of balls included in each ball group may be changed under the premise that the number of balls included in the first ball group BG1 is different from the number of balls included in the second ball group BG2. Hereinafter, for convenience of explanation, the description describes one or more embodiments in which the first ball group BG1 includes three balls and the second ball group BG2 includes two balls.

Among three balls included in the first ball group BG1, two balls disposed at the outermost side in the direction parallel to the optical axis (Z-axis) may have the same diameter, and one ball disposed therebetween may have a diameter smaller than those of the balls disposed at the outermost side.

For example, among the plurality of balls included in the first ball group BG1, two balls disposed at the outermost side in the direction parallel to the optical axis (Z-axis) may have a first diameter, and one ball disposed therebetween may have a second diameter. Here, the first diameter may be greater than the second diameter.

Two balls included in the second ball group BG2 may have the same diameter. For example, two balls included in the second ball group BG2 may have a third diameter.

Here, the first diameter and the third diameter may be the same as each other. Here, the same diameter may indicate the same diameter, including a manufacturing error as well as the physically same diameter.

A distance between the centers of the balls disposed at the outermost side in the direction parallel to the optical axis (Z-axis) among the plurality of balls included in the first ball group BG1 and a distance between centers of the balls disposed at the outermost side in the direction parallel to the optical axis (Z-axis) among the plurality of balls included in the second ball group BG2 may be different from each other.

For example, the distance between the centers of two balls, each having the first diameter, may be greater than the distance between the centers of two balls, each having the third diameter.

An action center point CP of the attractive force acting between the first magnet 510 and the first yoke 570 may be desired to be positioned within a support area A where contact points between the first ball member B1 and the carrier 400 (or the housing 110) are connected with each other in order for the carrier 400 to be moved parallel to the optical axis (Z-axis) direction (that is, to be prevented from being tilted) when moved in the optical axis (Z-axis) direction.

If the action center point CP of the attractive force deviates from the support area A, the carrier 400 may have a shifted position during its movement, which may cause a risk in which the carrier 400 is tilted. Therefore, making the support area A as wide as possible may be desirable.

In one or more embodiments of the present disclosure, each size (e.g., diameter) of some of the plurality of balls included in the first ball member B1 may be intentionally smaller than each size (e.g., diameter) of the other balls. In this case, larger balls among the of balls may be intentionally brought into contact with the carrier 400 (or the housing 110).

Referring to FIG. 6, among three balls of the first ball group BG1, the diameters of two balls may be larger than the diameter of the other ball, and the two balls of the first ball group BG1 may each be in contact with the carrier 400 or the housing 110. In addition, two balls of the second ball group BG2 may have the same diameter, and the two balls of the second ball group BG2 may be in contact with carrier 400 and the housing 110.

Accordingly, as shown in FIG. 6, the first ball member B1 may be in four-point contact with the carrier 400 (or the housing 110) when viewed in a second axis (Y-axis) direction. In addition, the support area A, where the contact points are connected to each other, may have a rectangular shape (e.g., trapezoid).

Therefore, the support area A may be made wider, and the action center point CP of the attractive force acting between the first magnet 510 and the first yoke 570 may thus be stably positioned in the support area A. It is thus possible to ensure the driving stability of the camera module during the auto-focusing.

Meanwhile, even when two balls of the second ball group BG2 are manufactured to have the same diameter, the two balls of the second ball group BG2 may not physically have exactly the same diameter due to manufacturing error or the like. In this case, any one of the two balls of the second ball group BG2 may be in contact with the carrier 400 or the housing 110.

Accordingly, the support area A, where the contact points at which the first ball member B1 is in contact with the carrier 400 or the housing 110 are connected to each other, may have a triangular shape.

Even when the support area A has a triangular shape, the support area A may be made wider by the balls positioned at the outermost side in the direction parallel to the optical axis (Z-axis) among three balls of the first ball group BG1, thereby ensuring the driving stability of the camera module during the autofocusing.

Apart from securing the driving stability during the auto-focusing, it may also be important for the camera module 1 to have a smaller height (or to be made slim) in the optical axis (Z-axis) direction. When the camera module 1 simply has a smaller height in the optical axis (Z-axis) direction, the support area A may also have a smaller height in the optical axis (Z-axis) direction.

Accordingly, there is a risk that a problem may occur in the driving stability of the camera module during the auto-focusing when the camera module 1 simply has the smaller height in the optical axis (Z-axis) direction.

Therefore, the camera module 1, according to one or more embodiments of the present disclosure, may include the third groove g3 and the fourth groove g4, which have different lengths in the optical axis (Z-axis) direction. For example, the length of the third groove g3 in the optical axis (Z-axis) direction may be greater than the length of the fourth groove g4 in the optical axis (Z-axis) direction.

In addition, the action center point CP of the attractive force acting between the first magnet 510 and the first yoke 570 may be positioned closer to the third groove, which is the main guide. In this way, the action center point CP of the attractive force may be stably positioned in the support area A even when the camera module 1 has a smaller height in the optical axis direction.

In one or more embodiments of the present disclosure, the number of the plurality of balls included in the first ball group BG1 and the number of the plurality of balls included in the second ball group BG2 may be different from each other, and the lengths of the respective spaces, in which the respective ball groups are accommodated, in the optical axis (Z-axis) direction may be different from each other. In this way, it is possible to prevent the size of the support area A from being changed, or prevent the action center point CP of the attractive force from deviating from the support area A even when the size of the support area A is changed.

In addition, the support area A may have a larger size by making the length of the third groove g3, corresponding to the main guide, greater than the length of the fourth groove g4, corresponding to the auxiliary guide among the main guide and the auxiliary guide.

Meanwhile, in one or more embodiments, the first magnet 510 may be disposed so that the action center point CP of the attractive force generated between the first yoke 570 and the first magnet 510 is positioned closer to the main guide than to the auxiliary guide.

For example, the first magnet 510 on one side surface of the carrier 400 may be disposed eccentrically to one side in a length direction (e.g., first axis (X-axis) direction) of the first magnet 510.

A center of one side of the carrier 400 and a center of the first magnet 510 may be misaligned from each other. The first magnet 510 may be eccentrically disposed toward the main guide.

That is, the first magnet 510 may be disposed closer to the main guide than to the auxiliary guide.

Meanwhile, in another one or more embodiments, a sub-yoke 590 may be disposed to face the first magnet 510. For example, the sub-yoke 590 may be disposed on the substrate 750 to face the first magnet 510.

The sub-yoke 590 may be positioned closer to the main guide than to the auxiliary guide. The sub-yoke 590 may be made of a material that may generate an attractive force with respect to the first magnet 510.

Accordingly, a resultant force of the attractive force acting between the first magnet 510 and the first yoke 570 and the attractive force acting between the first magnet 510 and the sub-yoke 590 may be positioned closer to the main guide than to the auxiliary guide.

The support area A may have a greater length in the optical axis (Z-axis) direction as being closer to the main guide. Therefore, the resultant force of the attractive force between the first magnet 510, the first yoke 570 and the sub-yoke 590 may be arranged closer to the main guide, thereby more stably positioning the action center point CP of the attractive force in the support area A.

In one or more embodiments, the camera actuator 10 may detect the position of the carrier 400 in the optical axis (Z-axis) direction.

To this end, a first position sensor 550 may be provided. The first position sensor 550 may be disposed on the substrate 750 to face the first magnet 510. The first position sensor 550 may be a Hall sensor.

Meanwhile, the camera actuator 10 may perform the optical image stabilization during capturing the subject by moving the lens module 200 in the direction perpendicular to the optical axis (Z-axis). To this end, the camera actuator may include a second driving unit 600, moving the lens module 200 in the direction perpendicular to the optical axis (Z-axis).

The guide frame 300 and the lens module 200 may be sequentially accommodated in the carrier 400. For example, the guide frame 300 may be disposed between the carrier 400 and the lens module 200. The guide frame 300 may have a hollow rectangular plate shape.

The guide frame 300 and the lens module 200 may be moved together in one direction perpendicular to the optical axis (Z-axis) by a driving force of the second driving unit 600, and the lens module 200 may be moved relative to the guide frame 300 in the other direction perpendicular to the optical axis (Z-axis).

For example, the guide frame 300 and the lens module 200 may be moved together in the first axis (X-axis) direction perpendicular to the optical axis (Z-axis), and the lens module 200 may be moved relative to the guide frame 300 in the second axis (Y-axis) direction perpendicular to both the optical axis (Z-axis) and the first axis (X-axis).

The second driving unit 600 may include a first sub driving unit 610 and a second sub driving unit 630. The first sub driving unit 610 may generate the driving force in the first axis (X-axis) direction, and the second sub driving unit 630 may generate the driving force in the second axis (Y-axis) direction.

The first driving unit 610 may include a second magnet 611 and a second coil 613. The second magnet 611 and the second coil 613 may be disposed to face each other in the first axis (X-axis) direction.

The second magnet 611 may be disposed on the lens module 200. For example, the second magnet 611 may be mounted on one surface of the OIS frame 250.

The second magnet 611 may be magnetized so that one surface (e.g., the surface facing the second coil 613) thereof has both the N pole and the S pole. For example, the N pole, the neutral area, and the S pole may be sequentially positioned on the one surface of the second magnet 611, facing the second coil 613, in the second axis (Y-axis) direction. The second magnet 611 may be long in the second axis (Y-axis) direction.

The other surface (e.g., the surface opposite to the one surface) of the second magnet 611 may be magnetized to have both the S pole and the N pole. For example, the S pole, the neutral area, and the N pole may be sequentially positioned on the other surface of the second magnet 611 in the second axis (Y-axis) direction.

The second coil 613 may be disposed to face the second magnet 611. For example, the second coil 613 may be disposed to face the second magnet 611 in the first axis (X-axis) direction.

The second coil 613 may have a hollow donut shape, and may be long in the second axis (Y-axis) direction. The second coil 613 may include a plurality of coils. For example, the second coil 613 may include two coils spaced apart from each other in the second axis (Y-axis) direction, and each coil may be disposed to face the second magnet 611.

During the optical image stabilization, the second magnet 611 may be a moving member mounted on the OIS frame 250, and the second coil 613 may be a fixed member fixed to the housing 110.

When the power is applied to the second coil 613, the OIS frame 250 and the guide frame 300 may be moved in the first axis (X-axis) direction by an electromagnetic force generated between the second magnet 611 and the second coil 613.

The second magnet 611 and the second coil 613 may generate a driving force in a direction (e.g., first axis (X-axis) direction) in which the second magnet 611 and the second coil 613 face each other.

The second sub driving unit 630 may include a third magnet 631 and a third coil 633. The third magnet 631 and the third coil 633 may be disposed to face each other in the second axis (Y-axis) direction.

The third magnet 631 may be disposed on the lens module 200. For example, the third magnet 631 may be mounted on the other surface of the OIS frame 250.

The third magnet 631 may be magnetized so that one surface (e.g., the surface facing the third coil 633) thereof has both the S pole and the N pole. For example, the S pole, the neutral area, and the N pole may be sequentially positioned on the one surface of the third magnet 631, facing the third coil 633, in the first axis (X-axis) direction. The third magnet 631 may be long in the first axis (X-axis) direction.

The other surface (e.g., the surface opposite to the one surface) of the third magnet 631 may be magnetized to have both the N pole and the S pole. For example, the N pole, the neutral area, and the S pole may be sequentially positioned on the other surface of the third magnet 631 in the first axis (X-axis) direction.

The third coil 633 may be disposed to face the third magnet 631. For example, the third coil 633 may be disposed to face the third magnet 631 in the second axis (Y-axis) direction.

The second coil 613 and the third coil 633 may be positioned on the substrate 750. For example, the second coil 613 and the third coil 633 may be disposed on the substrate 750 to respectively face the second magnet 611 and the third magnet 631.

The substrate 750 may be mounted on the side surface of the housing 110, and the second coil 613 and the third coil 633 may directly face the second magnet 611 and the third magnet 631 through the opening positioned in the housing 110.

The third coil 633 may have a hollow donut shape, and may be long in the first axis (X-axis) direction. The third coil 633 may include a plurality of coils. For example, the third coil 633 may include two coils spaced apart from each other in the first axis (X-axis) direction, and each coil may be disposed to face the third magnet 631.

During the optical image stabilization, the third magnet 631 may be the moving member mounted on the OIS frame 250, and the third coil 633 may be the fixed member fixed to the housing 110.

When the power is applied to the third coil 633, the OIS frame 250 may be moved in the second axis (Y-axis) direction by an electromagnetic force generated between the third magnet 631 and the third coil 633.

The third magnet 631 and the third coil 633 may generate a driving force in a direction (e.g., second axis (Y-axis) direction) in which the third magnet 631 and the third coil 633 face each other.

The second magnet 611 and the third magnet 631 may be disposed perpendicular to each other on a plane perpendicular to the optical axis (Z-axis), and the second coil 613 and the third coil 633 may also be disposed perpendicular to each other on the plane perpendicular to the optical axis (Z-axis).

A plurality of ball members supporting the guide frame 300 and the lens module 200 may be provided in the camera actuator 10 according to one or more embodiments of the present disclosure. The plurality of ball members may serve to guide the movement of the guide frame 300 and the lens module 200 during the optical image stabilization. In addition, the ball members may also function to maintain a gap between the carrier 400, the guide frame 300, and the lens module 200.

The plurality of ball members may include a second ball member B2 and a third ball member B3.

The second ball member B2 may guide the movement of the guide frame 300 and the lens module 200 in the first axis (X-axis) direction, and the third ball member B3 may guide the movement of the lens module 200 in the second axis (Y-axis) direction.

For example, the second ball member B2 may roll in the first axis (X-axis) direction when the driving force is generated in the first axis (X-axis) direction. Therefore, the second ball members B2 may guide the movement of the guide frame 300 and the lens module 200 in the first axis (X-axis) direction.

The third ball member B3 may roll in the second axis (Y-axis) direction when the driving force is generated in the second axis (Y-axis) direction. Therefore, the third ball member B3 may guide the movement of the lens module 200 in the second axis (Y-axis) direction.

The second ball members B2 may include a plurality of ball members arranged between the carrier 400 and the guide frame 300, and the third ball members B3 may include a plurality of ball members arranged between the guide frame 310 and the lens module 200.

For example, referring to FIG. 4, the second ball member B2 and the third ball member B3 may each include four ball members.

A third guide groove 420 accommodating the second ball member B2 may be positioned in at least one of the surfaces of the carrier 400 and the guide frame 300, facing each other, in the optical axis (Z-axis) direction. The third guide groove 420 may include a plurality of guide grooves corresponding to the plurality of ball members included in the second ball members B2.

The second ball member B2 may be accommodated in the third guide groove 420 and be fitted between the carrier 400 and the guide frame 300.

When accommodated in the third guide groove 420, the second ball member B2 may be restricted from being moved in the optical axis (Z-axis) direction or the second axis (Y-axis) direction, and may be moved only in the first axis (X-axis) direction. For example, the second ball member B2 may roll only in the first axis (X-axis) direction.

To this end, each plane of the plurality of guide grooves included in the third guide groove 420 may have a shape of a rectangle long in the first axis (X-axis) direction.

A fourth guide groove 310 accommodating the third ball member B3 may be positioned in at least one of the surfaces of the guide frame 300 and the lens module 200 (e.g., OIS frame 250), facing each other, in the optical axis (Z-axis) direction. The fourth guide groove 310 may include a plurality of guide grooves corresponding to the plurality of ball members included in the third ball member B3.

The third ball member B3 may be accommodated in the fourth guide groove 310 and be fitted between the guide frame 300 and the lens module 200.

When accommodated in the fourth guide groove 310, the third ball member B3 may be restricted from being moved in the optical axis (Z-axis) direction or the first axis (X-axis) direction, and may be moved only in the second axis (Y-axis) direction. For example, the third ball member B3 may roll only in the second axis (Y-axis) direction.

To this end, each plane of the plurality of guide grooves included in the fourth guide groove 310 may have a shape of a rectangle long in the second axis (Y-axis) direction.

When the driving force is generated in the first axis (X-axis) direction, the guide frame 300 and the lens module 200 may be moved together in the first axis (X-axis) direction.

Here, the second ball member B2 may roll along the first axis (X-axis). In this case, the movement of the third ball member B3 may be restricted.

In addition, when the driving force is generated in the second axis (Y-axis) direction, the lens module 200 may be moved relative to the guide frame 300 in the second axis (Y-axis) direction.

Here, the third ball member B3 may roll along the second axis (Y-axis). Here, the movement of the second ball member B2 may be restricted.

In one or more embodiments, the camera actuator 10 may detect the position of the lens module 200 in the direction perpendicular to the optical axis (Z-axis).

To this end, a second position sensor 615 and a third position sensor 635 may be provided. The second position sensor 615 may be disposed on the substrate 750 to face the second magnet 611, and the third position sensor 635 may be disposed on the substrate 750 to face the third magnet 631. The second position sensor 615 and the third position sensor 635 may be the Hall sensors.

At least one of the second position sensor 615 and the third position sensor 635 may include two Hall sensors. For example, the third position sensor 635 may include two Hall sensors disposed to face the third magnet 631.

The third position sensor 635 may detect whether the lens module 200 is rotated through the two Hall sensors facing the third magnet 631. The third coil 633 may include two coils facing the third magnet 631, and thus offset a rotational force applied to the lens module 200 by controlling the third coil 633.

The lens module 200 may be prevented from being rotated by the third guide groove 420 and the fourth guide groove 310 in which the second ball member B2 and the third ball member B3 are disposed. Still, the lens module 200 may rotate minutely due to component tolerances in manufacturing a mechanism.

However, the camera actuator 10, according to one or more embodiments of the present disclosure, may determine whether the lens module 200 is rotated through the third coil 633 and the third position sensor 635 and offset the resulting rotational force.

Meanwhile, a second yoke 430 and a third yoke 440 may be provided in the present disclosure so that the carrier 400 and the guide frame 300 maintain contact with the second ball member B2, and the guide frame 300 and the lens module 200 maintain contact with the third ball member B3.

The second yoke 430 and the third yoke 440 may be fixed to the carrier 400, and disposed to face the second magnet 611 and the third magnet 631 in the optical axis (Z-axis) direction.

Therefore, attractive forces may respectively be generated between the second yoke 430 and the second magnet 611 and between the third yoke 440 and the third magnet 631 in the optical axis (Z-axis) direction.

The lens module 200 and the guide frame 300 may be pressed toward the second yoke 430 and the third yoke 440 by the attractive force generated between the second yoke 430 and the third yoke 440 and between the second magnet 611 and the third magnet 631. Accordingly, the guide frame 300 and the lens module 200 may maintain contact with the second ball member B2 and the third ball member B3.

The second yoke 430 and the third yoke 440 may each be made of a material that may generate the attractive force between the second magnet 611 and the third magnet 631. For example, the second yoke 430 and the third yoke 440 may each be made of magnetic material.

Meanwhile, a stopper 270 may be coupled to the carrier 400 to cover at least a portion of an upper surface of the lens holder 200. For example, the stopper 270 may cover at least a portion of the upper surface of the OIS frame 250.

The stopper 270 may prevent the guide frame 300 and the lens holder 200 from being separated externally from the carrier 400 due to an external impact or the like.

Figure 8:
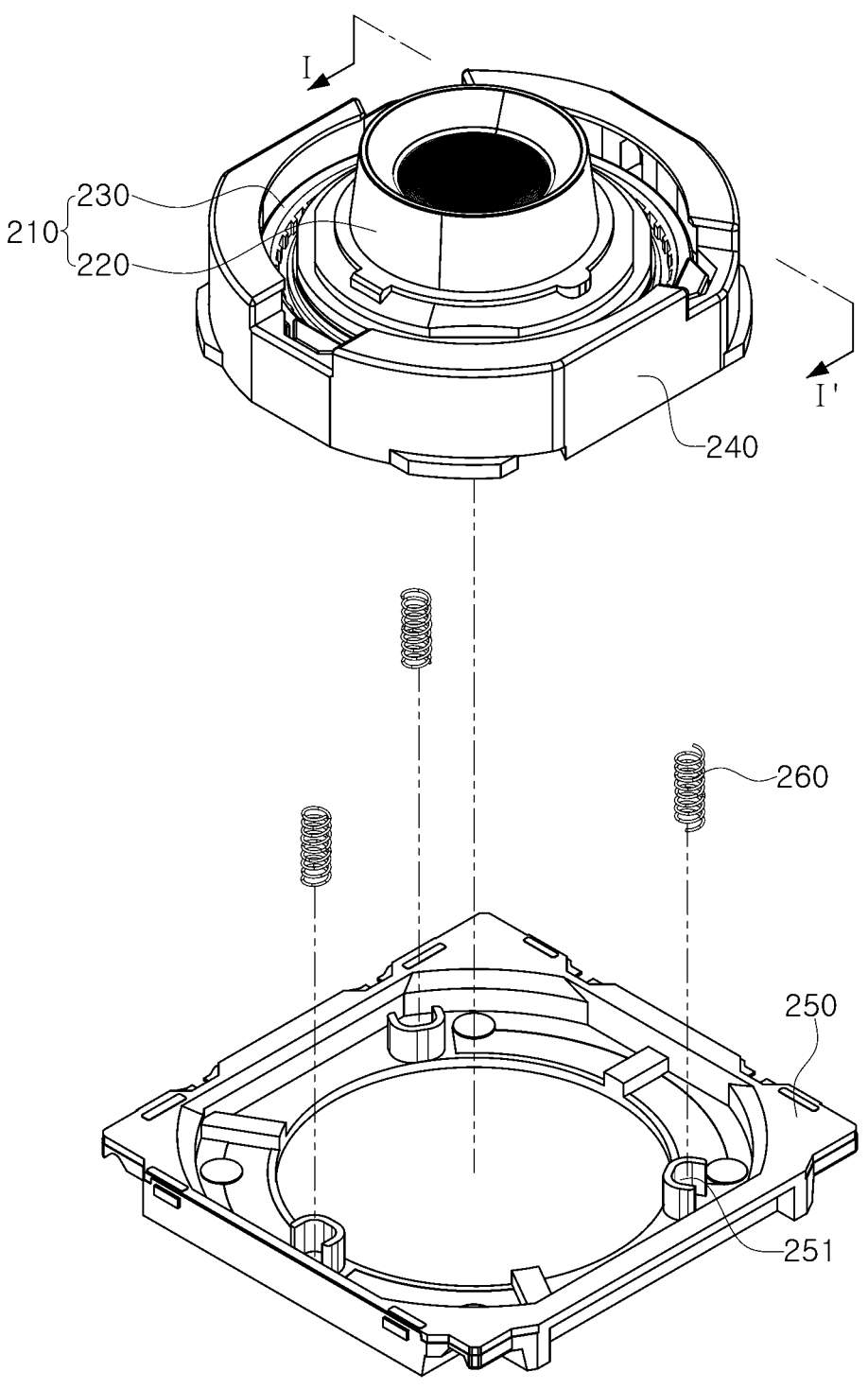
FIG. 8 is a partially exploded perspective view of a lens module.
Figure 9:
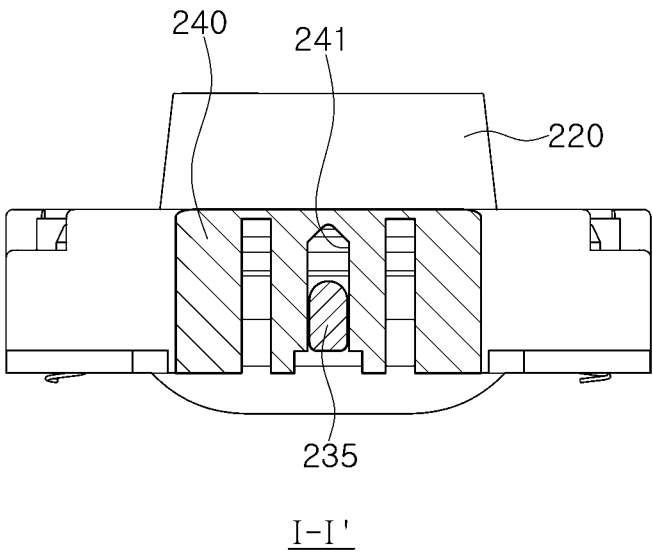
FIG. 9 is a cross-sectional view taken along line I-I' of FIG. 8.
Figure 10:
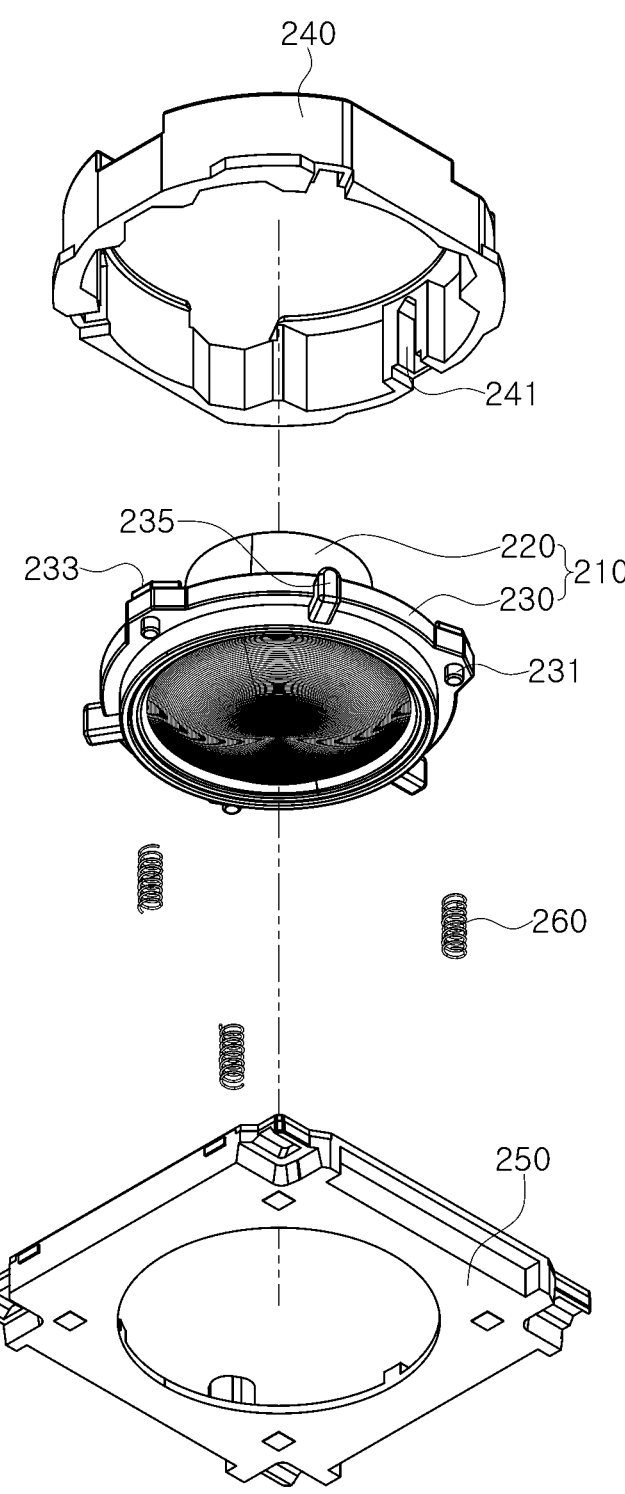
FIG. 10 is a bottom perspective view showing that the lens module is disassembled.

FIG. 8 is a partially exploded perspective view of the lens module, FIG. 9 is a cross-sectional view taken along line I-I' of FIG. 8, and FIG. 10 is a bottom perspective view showing that the lens module is disassembled.

The lens module 200 may include the lens unit 210, the guide holder 240, and the OIS frame 250, and may further include an elastic member 260.

The lens unit 210 may include the lens barrel 220 and the lens holder 230, and the lens barrel 220 and the lens holder 230 may be coupled with each other. In addition, the guide holder 240 may be coupled to the OIS frame 250.

The lens unit 210 may be disposed on the guide holder 240 to be movable in the optical axis (Z-axis) direction. That is, the lens unit 210 may be moved relative to the guide holder 240. This configuration is to adjust the position of the lens unit 210 in the optical axis (Z-axis) direction based on whether the camera module is in use or not.

For example, referring to FIGS. 1A and 1B, when the camera module 1 is not in use, the lens barrel 220 may be moved relative to the guide holder 240 downward in the optical axis (Z-axis) direction (or toward an image sensor 710) to prevent the lens barrel 220 from protruding outward from the camera actuator 10 or to minimize its protrusion level.

On the other hand, when the camera module is in use, the lens barrel 220 may be moved relative to the guide holder 240 upward in the optical axis (Z-axis) direction (or toward the subject).

Typical camera modules have a problem: a part of the camera module (e.g., lens unit) protrudes from the portable electronic device.

However, the camera module 1, according to one or more embodiments of the present disclosure, may solve this problem that the lens unit 210 always protrudes from the portable electronic device by moving the position of the lens barrel 220 based on whether the camera module 1 is in use.

The lens unit 210 may be accommodated in the guide holder 240, and the guide holder 240 may be fixed to the OIS frame 250. In addition, the elastic member 260 may be disposed between the lens unit 210 and the OIS frame 250.

Accordingly, the lens unit 210 may be moved relative to the guide holder 240 and the OIS frame 250 in the optical axis (Z-axis) direction while being elastically supported by the elastic member 260.

The elastic member 260 may have a shape in which the elastic member 260 provides an elastic force in the optical axis (Z-axis) direction. In one or more embodiments, three elastic members 260 may be provided, and the three elastic members 260 may be spaced apart at a 120° gap. However, the spirit of the present disclosure is not limited to the number of elastic members 260.

Coupling protrusions 231 and 251 may respectively protrude from the surfaces of the lens holder 230 and the OIS frame 250, facing each other, in the optical axis (Z-axis) direction.

The elastic member 260 may have one end coupled to the coupling protrusion 251 of the OIS frame 250, and the other end coupled to the coupling protrusion 231 of the lens holder 230.

A guide structure may be provided between the lens unit 210 and the guide holder 240 for the lens unit 210 to be moved in parallel in the optical axis (Z-axis) direction.

For example, a protrusion part 235 may be disposed on one of the lens unit 210 and the guide holder 240, and a guide groove part 241 may be disposed in the other.

One or more embodiments describes that the protrusion part 235 is disposed on the lens unit 210, and the guide groove part 241 is disposed in the guide holder 240. However, the positions of the protrusion part 235 and the guide groove part 241 may be changed with each other.

The protrusion part 235 may be disposed on a side surface of the lens unit 210 (e.g., lens holder 230) while protruding in the direction perpendicular to the optical axis (Z-axis), and the guide groove part 241 may be disposed in an inner surface of the guide holder 240, facing the protrusion part 235.

At least three protrusion parts 235 may be provided, and these protrusion parts 235 may be spaced apart from each other (e.g., at 120° gap) in a circumferential direction of the lens unit 210.

The guide groove part 241 may be long in the optical axis (Z-axis) direction. The number of protrusion parts 235 and the guide groove parts 241 may correspond to each other.

The protrusion part 235 may be disposed on the guide groove part 241 and slide along the guide groove part 241.

A lubricant may be applied to the guide groove part 241 to reduce friction with the protrusion part 235.

Each protrusion part 235 may have a convex curved upper end. An upper end of the guide groove part 241 may have a plurality of inclined surfaces (e.g., two inclined surfaces). The upper end of the guide groove part 241 may have a '∧' shape by the plurality of inclined surfaces.

Therefore, when the lens barrel 220 is moved upward in the optical axis (Z-axis) direction for the use of the camera module 1, the lens barrel 220 may be placed in an accurate position by making the protrusion part 235 in point contact or line contact with the guide groove part 241 at least at two points in the optical axis (Z-axis) direction.

The lens holder 230 may include an extension part 233 extending from a point where the elastic member 260 is coupled thereto in the optical axis (Z-axis) direction.

That is, a thickness of the lens holder 230 in the optical axis (Z-axis) direction at the position where the elastic member 260 is coupled thereto may be greater than the thickness of the other parts of the lens holder 230 in the optical axis (Z-axis) direction. Accordingly, it is possible to improve the rigidity of a portion of the lens holder 230, to which the elastic force is applied.

The extension part 233 of the lens holder 230 may also function to receive the driving force for moving the lens unit 210 downward in the optical axis (Z-axis) direction.

For example, when the camera module 1 is not in use, the lens unit 210 may be pressed downward in the optical axis (Z-axis) direction by the pop-out module 20 described below for the lens unit 210 to be moved downward in the optical axis (Z-axis) direction. Here, the extension part 233 of the lens unit 210 may be pressed by the pop-out module 20.

When the camera module 1 is in use, a pressing force by the pop-out module 20 may be released, and accordingly, the lens unit 210 may be moved upward in the optical axis (Z-axis) direction by the elastic force of the elastic member 260.

That is, the elastic member 260 may be pressed to support the lens unit 210 when the lens unit 210 is positioned below the optical axis (Z-axis) direction, and the lens unit 210 may be moved upward in the optical axis (Z-axis) direction by the elastic force of the elastic member 260 when the pressing force is removed.

Figure 11:
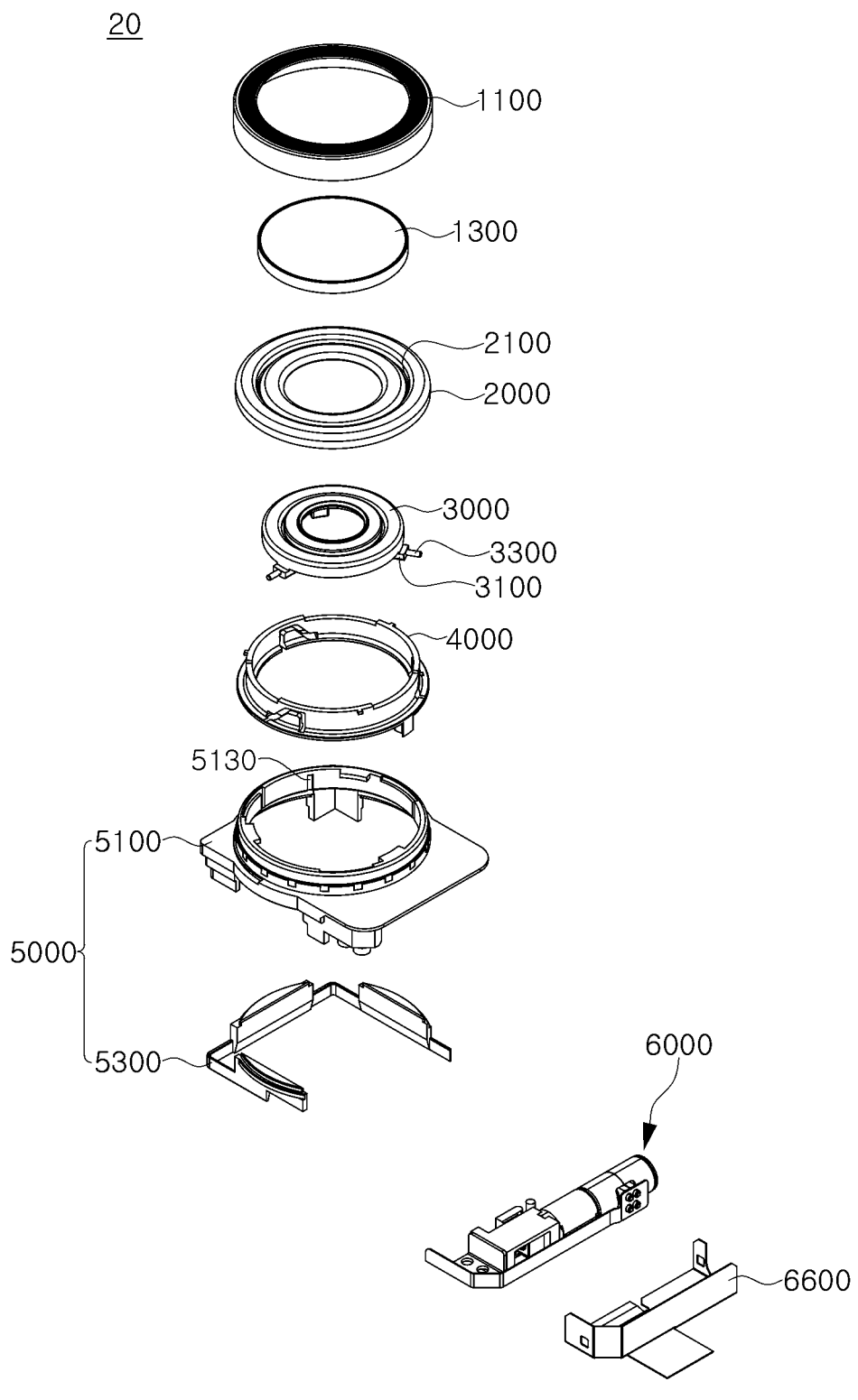
FIG. 11 is an exploded perspective view of the pop-out module according to one or more embodiments of the present disclosure.
Figure 12:
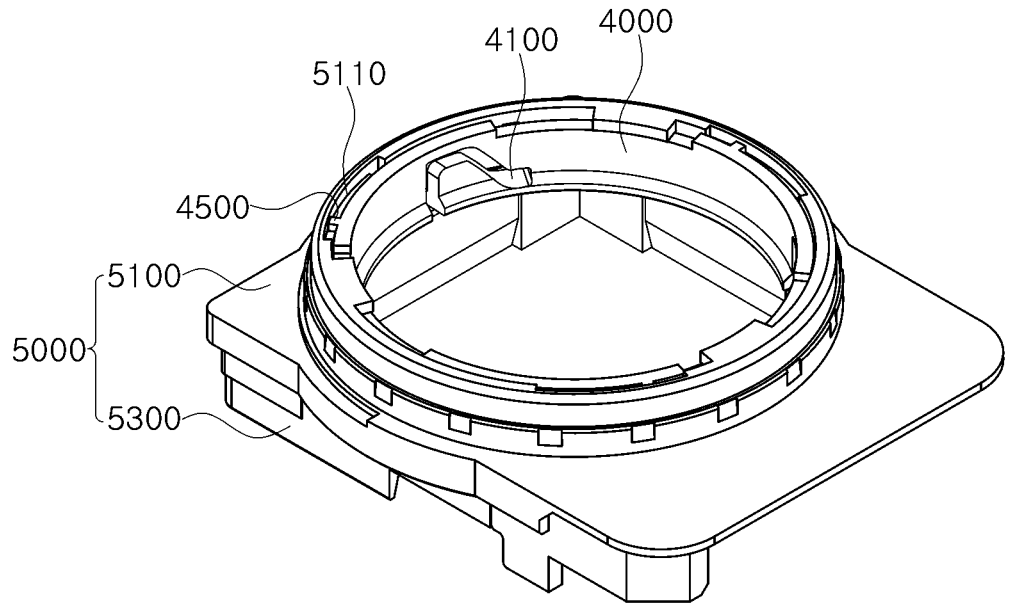
FIG. 12 is a perspective view showing that a guide housing and a lifting guide are coupled with each other in the pop-out module according to one or more embodiments of present disclosure.

FIG. 11 is an exploded perspective view of the pop-out module according to one or more embodiments of the present disclosure, and FIG. 12 is a perspective view showing that a guide housing and a lifting guide are coupled with each other in the pop-out module according to one or more embodiments of present disclosure.

Figure 13:
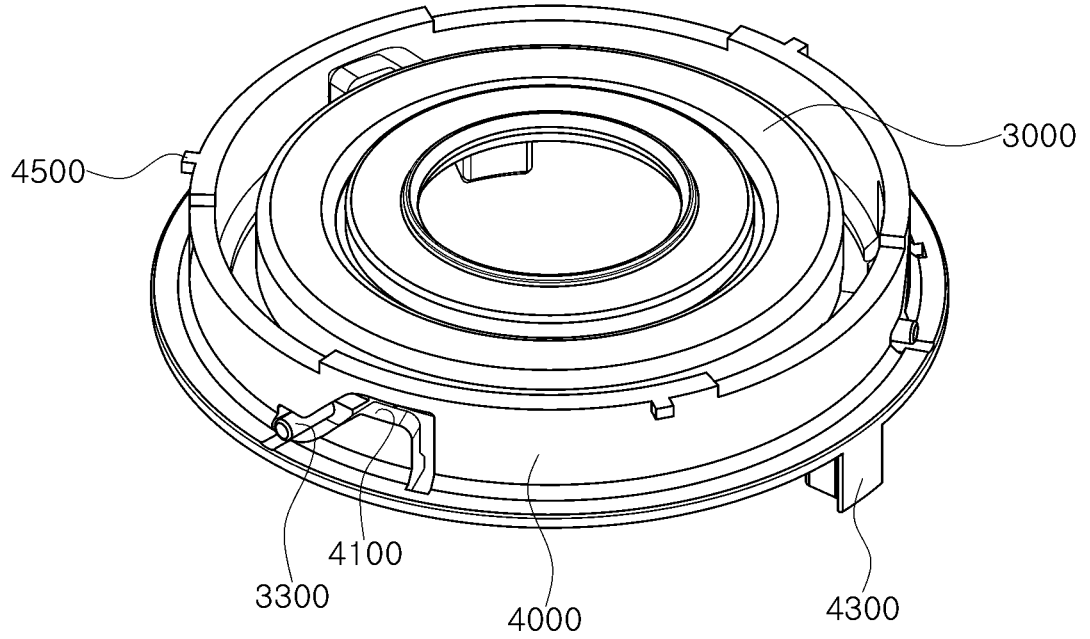
FIG. 13 is a perspective view showing that the lifting guide and a lifting member are coupled with each other in the pop-out module according to one or more embodiments of present disclosure.
Figure 14:
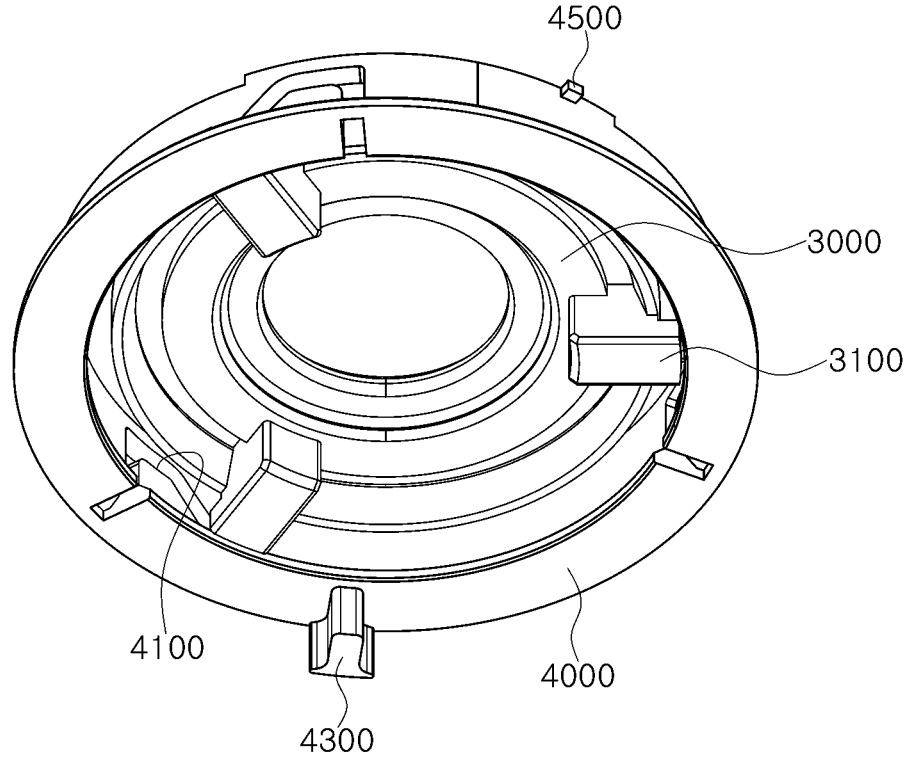
FIG. 14 is a bottom perspective view of FIG. 13.

In addition, FIG. 13 is a perspective view showing that the lifting guide and a lifting member are coupled with each other in the pop-out module according to one or more embodiments of present disclosure, and FIG. 14 is a bottom perspective view of FIG. 13.

Figure 15:
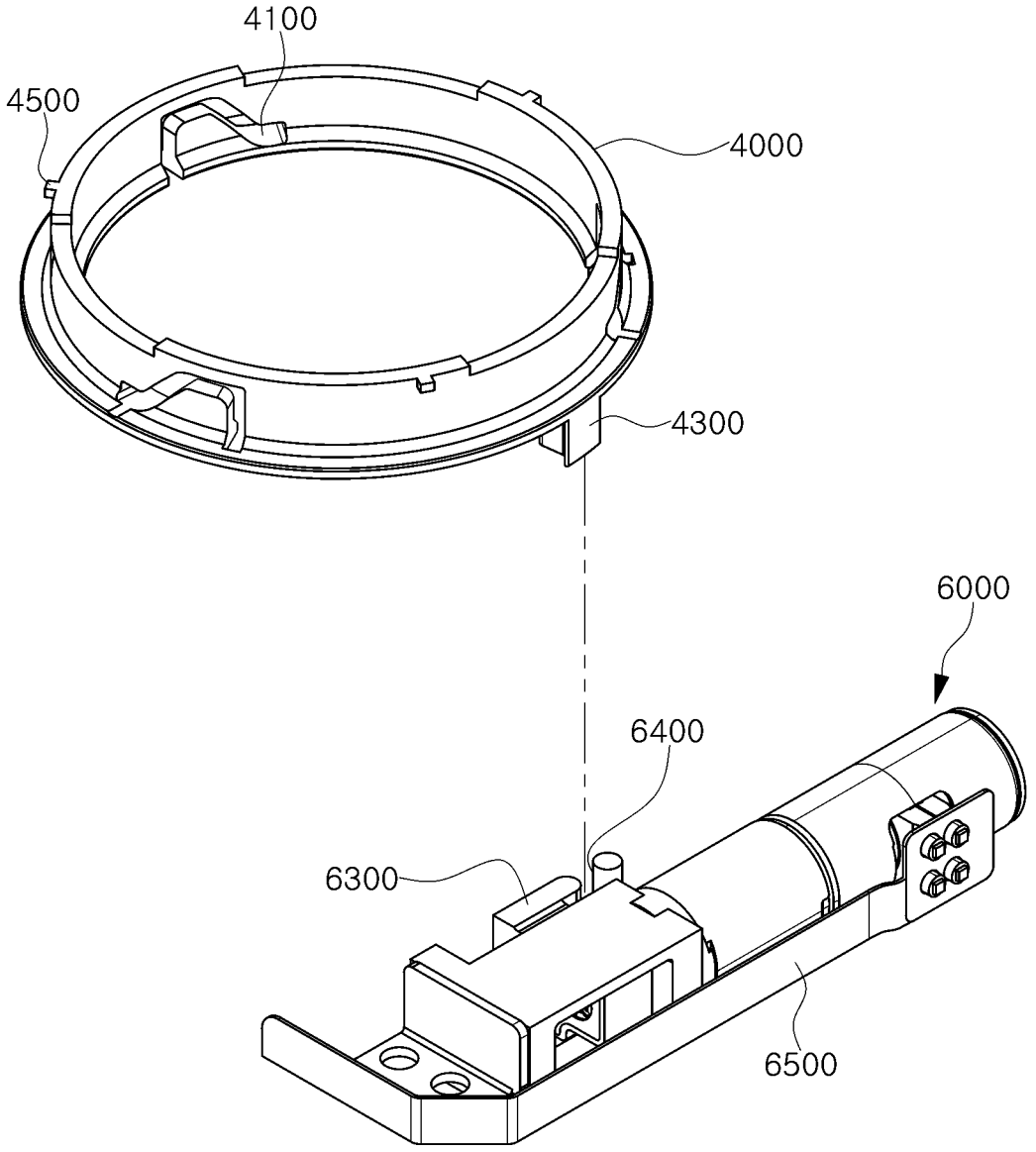
FIG. 15 is a perspective view of the lifting guide and a third driving unit of the pop-out module according to one or more embodiments of the present disclosure.
Figure 16:
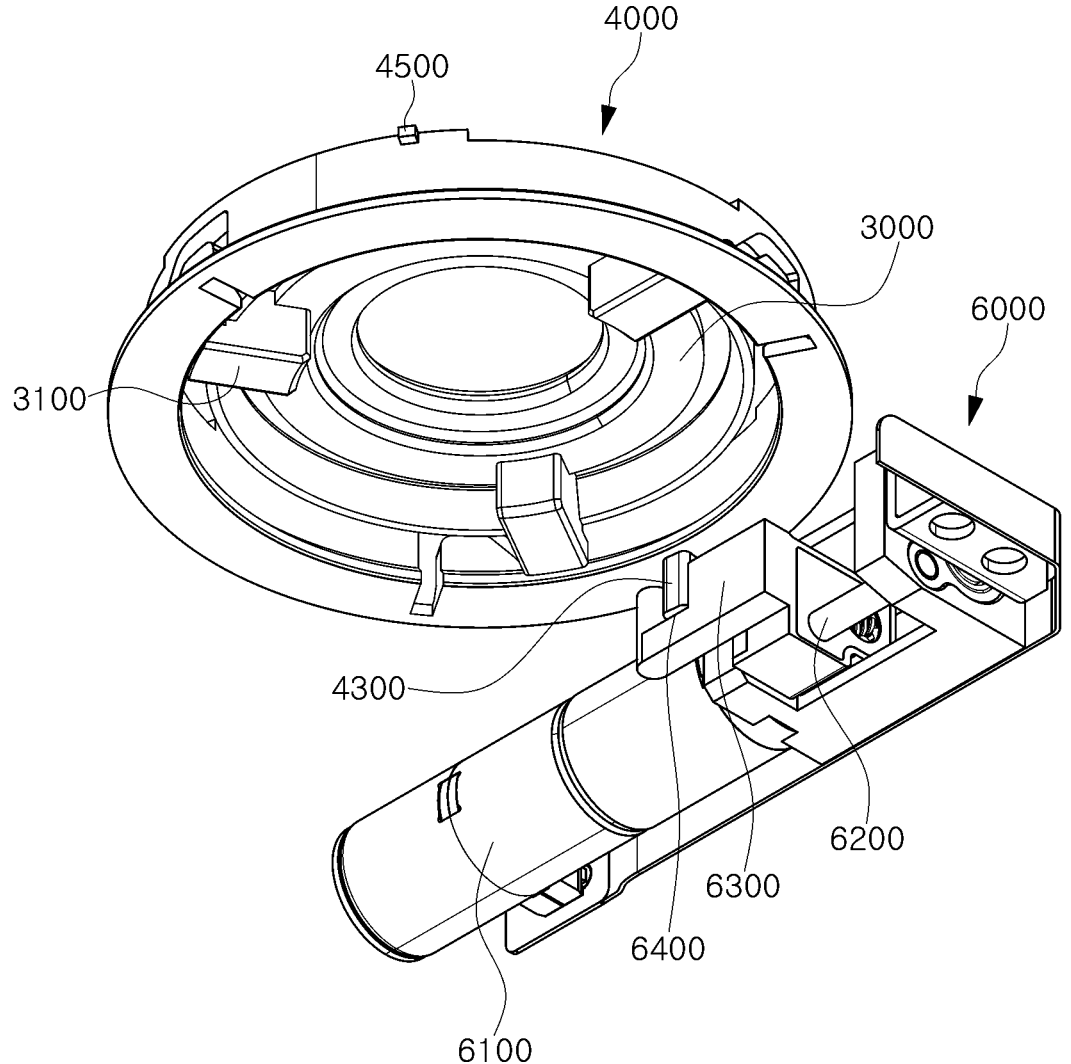
FIG. 16 is a bottom perspective view showing that the lifting guide and the third driving unit are coupled with each other in the pop-out module according to one or more embodiments of present disclosure.

In addition, FIG. 15 is a perspective view of the lifting guide and a third driving unit of the pop-out module according to one or more embodiments of the present disclosure, and FIG. 16 is a bottom perspective view showing that the lifting guide and the third driving unit are coupled with each other in the pop-out module according to one or more embodiments of the present disclosure.

Figure 17:
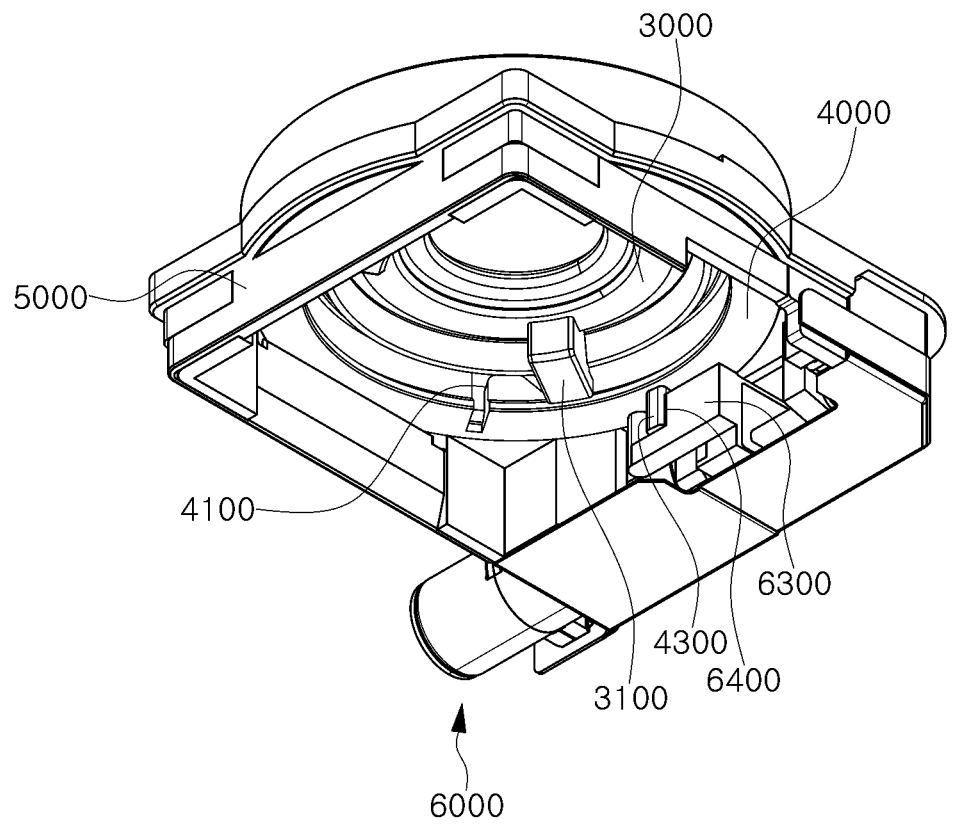
FIGS. 17 and 18 are bottom perspective views each showing that the lifting guide and the lifting member are moved in the pop-out module according to one or more embodiments of present disclosure.
Figure 18:
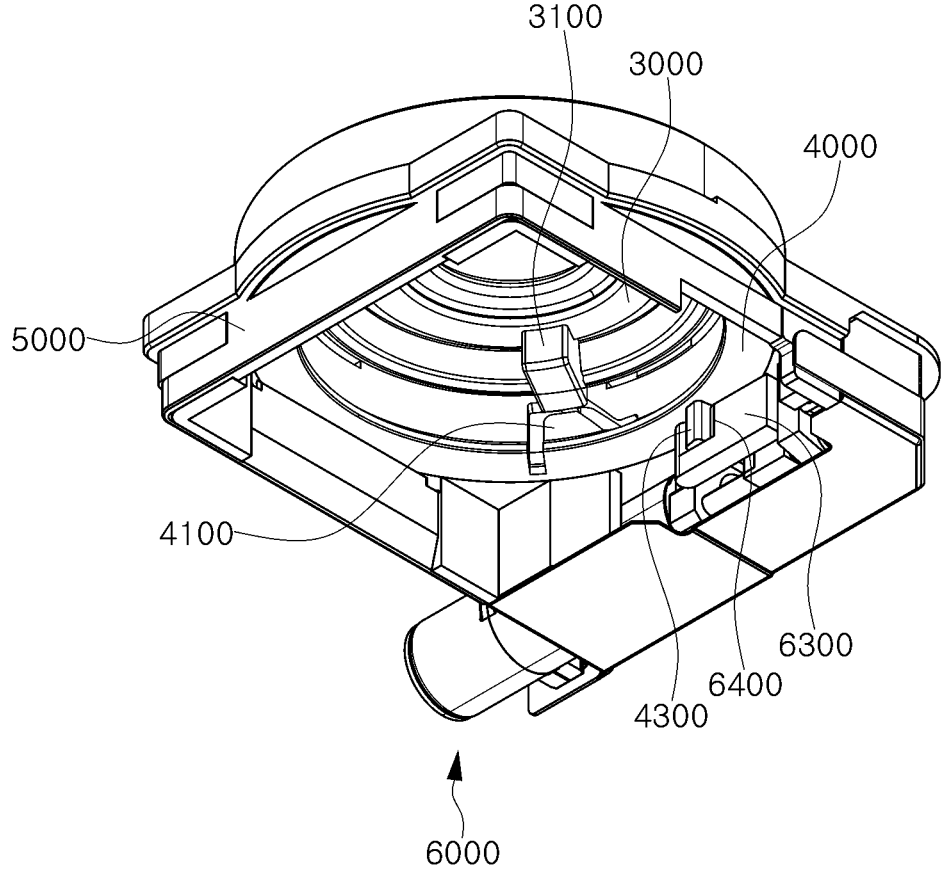

FIGS. 17 and 18 are bottom perspective views, each showing that the lifting guide and the lifting member are moved in the pop-out module according to one or more embodiments of the present disclosure.

Referring to FIGS. 11 through 18, the pop-out module 20 may include a guide housing 5000, a lifting guide 4000, a lifting member 3000, and a third driving unit 6000, and may further include a sealing member 2000, a cover glass 1300, and a cover 1100.

The guide housing 5000 may have an open top and bottom, and may be coupled with the housing 110 of the camera actuator 10.

The guide housing 5000 may include a housing body 5100 and a support member 5300. The support member 5300 may be coupled to a lower portion of the housing body 5100. For example, when the lifting guide 4000 is accommodated in the housing body 5100, the support member 5300 may be coupled to the lower portion of the housing body 5100, and the lifting guide 4000 may be rotatably disposed in the guide housing 5000.

The lifting guide 4000 may be accommodated in the guide housing 5000. The lifting guide 4000 may have a shape of a cylinder having an open top and bottom.

The lifting guide 4000 may be rotatable with respect to the guide housing 5000. In addition, the lifting member 3000 may be coupled to the lifting guide 4000, and the lifting member 3000 may be moved in the optical axis (Z-axis) direction as the lifting guide 4000 is rotated.

The lifting member 3000 may be in contact with or be separated from the lens unit 210 of the camera actuator as the lifting member 3000 is moved in the optical axis (Z-axis) direction.

That is, the lifting member 3000 may be brought into contact with the lens unit 210 of the camera actuator 10 to press the lens unit 210 when the lifting guide 4000 is rotated in one direction, and the lifting member 3000 is thus moved downward in the optical axis (Z-axis) direction. Accordingly, the lens unit 210 may be moved downward in the optical axis (Z-axis) direction.

In addition, the lifting guide 4000 may be rotated in the other direction, and the lifting member 3000 may thus be moved upward in the optical axis (Z-axis) direction. In this case, the lifting member 3000 may be spaced apart from the lens unit 210 of the camera actuator 10, and the lens unit 210 may be moved upward in the optical axis (Z-axis) direction by the elastic force of the elastic member 260.

Referring to FIG. 12, a seating part 5110 may be positioned in an upper end of the guide housing 5000, and a support protrusion 4500 may be positioned on the upper end of the lifting guide 4000.

The support protrusion 4500 of the lifting guide 4000 may be disposed in the seating part 5110 of the guide housing 5000. The seating part 5110 may have a shape of a groove. For example, the seating part 5110 may be long in a circumferential direction of the lifting guide 4000, and have a shape of the groove having open upper and one side surfaces.

The support protrusion 4500 may be moved along the seating part 5110 in the circumferential direction as the lifting guide 4000 is rotated. Inner walls at both ends of the seating part 5110 in the circumferential direction may function to restrict a rotation range of the lifting guide 4000.

Referring to FIG. 13, the lifting member 3000 may include a pressure protrusion 3100 and a guide protrusion 3300.

The pressure protrusion 3100 may protrude from the lifting member 3000 downward in the optical axis (Z-axis) direction, and the guide protrusion 3300 may protrude from a side of the lifting member 3000 in the direction perpendicular to the optical axis (Z-axis). For example, the guide protrusion 3300 may protrude from the side of the pressure protrusion 3100 in the direction perpendicular to the optical axis (Z-axis).

In one or more embodiments, three pressure protrusions 3100 and three guide protrusions 3300 may respectively arranged, and the three pressure protrusions 3100 and the three guide protrusions 3300 may be spaced apart from one another at the 120° gap in a circumferential direction of the lifting member 3000. However, the spirit of the present disclosure is not limited to the number of the pressing protrusions 3100 and the number of the guide protrusions 3300.

The lifting member 3000 may be accommodated in the lifting guide 4000. A guide hole 4100 may be disposed in a sidewall of the lifting guide 4000. Three guide holes 4100 may be provided, and the three guide holes 4100 may be spaced apart from one another at the 120° gap in a circumferential direction of the lifting guide 4000. However, the spirit of the present disclosure is not limited to the number of guide holes 4100.

The guide hole 4100 may pass through the lifting guide 4000 in the direction perpendicular to the optical axis (Z-axis), and may be inclined with respect to the optical axis (Z-axis). In addition, the guide protrusion 3300 of the lifting member 3000 may be disposed in the guide hole 4100 of the lifting guide 4000.

Therefore, the guide protrusion 3300 may be moved along the inclined guide hole 4100 as the lifting guide 4000 is rotated, and the lifting member 3000 may thus be moved in the optical axis (Z-axis) direction.

A guide groove 5130 extending in the optical axis (Z-axis) direction may be disposed in an inner surface of the guide housing 5000. The guide protrusion 3300 may pass through the guide hole 4100 of the lifting guide 4000, and a portion of the guide protrusion 3300 may thus be disposed in the guide groove 5130 of the guide housing 5000.

Therefore, when the lifting guide 4000 is rotated, the guide protrusion 3300 of the lifting member 3000 may be moved in the optical axis (Z-axis) direction along the guide hole 4100 inclined with respect to the optical axis (Z-axis) and the guide groove 5130 extending in the optical axis (Z-axis) direction.

Referring to FIG. 14, a protrusion part 4300 may be disposed on the lifting guide 4000. The protrusion part 4300 may extend from one side of the lifting guide 4000 downward in the optical axis (Z-axis) direction.

In addition, the protrusion part 4300 of the lifting guide 4000 may be coupled with the third driving unit 6000. Accordingly, the lifting guide 4000 may be rotated by a driving force of the third driving unit 6000.

The third driving unit 6000 may include a motor 6100, a shaft 6200, and a guide member 6300, and may further include a substrate 6500, and a case 6600.

The shaft 6200 may extend from the motor 6100, and the guide member 6300 may be coupled to the shaft 6200. When the motor 6100 is driven, the guide member 6300 may be moved along the shaft 6200.

The substrate 6500 may be coupled to the motor 6100 to thus apply the power to the motor 6100. The case 6600 may be coupled to the motor 6100 to enclose, thus, at least portions of the motor 6100, the shaft 6200, and the guide 6300.

The protrusion part 4300 of the lifting guide 4000 may be coupled to the guide member 6300. For example, a guide groove 6400 may be disposed in the guide member 6300, and the protrusion part 4300 of the lifting guide 4000 may be fitted to the guide groove 6400.

In one or more embodiments, the protrusion part 4300 is disposed on the lifting guide 4000 and the guide groove 6400 is disposed on the guide member 6300 of the third driving unit. However, the positions of the protrusion part 4300 and the guide groove 6400 may be changed with each other.

Referring to FIGS. 17 and 18, the guide member 6300 may be translated along the shaft 6200 by the driving force of the third driving unit 6000, and the lifting guide 4000 coupled with the guide member 6300 may thus be rotated.

In addition, as the lifting guide 4000 is rotated, the lifting member 3000 may be moved along the inclined guide hole 4100 of the lifting guide 4000 in the optical axis (Z-axis) direction.

In addition, the lifting member 3000 may contact and press the lens unit 210 to move the lens unit 210 downward in the optical axis (Z-axis) direction, or may be spaced apart from the lens unit 210 so that the lens unit 210 is moved upward in the optical axis (Z-axis) direction.

Referring to FIG. 11, the sealing member 2000 may be coupled to the guide housing 5000. The sealing member 2000 may serve to seal the open top of the guide housing 5000.

The sealing member 2000 may have a hollow part, and the cover glass 1300 may be coupled to the sealing member 2000 to thus seal the hollow part of the sealing member 2000.

In addition, the cover 1100 may be coupled to the outside of the sealing member 2000.

The sealing member 2000 may have elasticity as a silicone material. The sealing member 2000 may have a bent part 2100, and the bent part 2100 of the sealing member 2000 may be deformed as the lifting member 3000 is moved in the optical axis (Z-axis) direction.

The sealing member 2000 may thus prevent an external foreign material from infiltrating the pop-out module 20. That is, the pop-out module 20 may have waterproof and dustproof functions.

As set forth above, the camera module according to one or more embodiments of the present disclosure may adjust the protrusion level of the lens module based on whether the camera module is in use or not.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a housing having an inner space;
a carrier, disposed in the inner space, configured to move relative to the housing in an optical axis direction;
a lens module accommodated in the carrier;
a guide housing coupled with the housing;
a lifting guide rotatable with respect to the guide housing;
a lifting member, separate from the carrier, configured to move in the optical axis direction as the lifting guide is rotated to selectively contact the lens module to press the lens module downward in the optical axis direction or be spaced apart from the lens module; and
a driving unit configured to transmit a driving force to the lifting guide, wherein a protrusion part is disposed on one of the lifting guide and the driving unit, and a guide groove, elongated in the optical axis direction, coupled to the protrusion part is disposed in another of the lifting guide and the driving unit.

2. The camera module of claim 1, wherein the driving unit includes a motor, a shaft extending from the motor, and a guide member movable along the shaft, and
the guide groove is disposed in the guide member.

3. The camera module of claim 1, wherein the lifting guide includes a guide hole inclined with respect to the optical axis direction, and
the lifting member includes a guide protrusion disposed in the guide hole.

4. The camera module of claim 3, wherein the guide groove extending in the optical axis direction is disposed in an inner surface of the guide housing, and
the guide protrusion passes through the guide hole to be disposed in the guide groove.

5. The camera module of claim 1, wherein the lifting guide includes a support protrusion extending in a direction perpendicular to the optical axis direction,
the guide housing includes a seating part in which the support protrusion is seated, and
the seating part is formed as a groove along a circumference of the lifting guide with open upper and one side surfaces.

6. The camera module of claim 1, further comprising a sealing member coupled with the guide housing to seal an open top of the guide housing,
wherein the sealing member is made of a material having elasticity.

7. The camera module of claim 6, wherein the sealing member has a hollow part,
a cover glass sealing the hollow part is coupled to the sealing member, and
the sealing member includes a bent part deformed as the lifting member is moved.

8. The camera module of claim 1, wherein the lens module includes
a lens unit including at least one lens,
a guide holder configured to guide and move the lens unit in the optical axis direction, and
as the lifting member is moved downward in the optical axis direction, the lens unit is pressed by the lifting member and moved downward relative to the guide holder in the optical axis direction.

9. The camera module of claim 8, wherein one of the lens unit and the guide holder includes a protrusion part protruding in a direction perpendicular to the optical axis direction, and another of the lens unit and the guide holder includes a guide groove part extending in the optical axis direction and in which the protrusion part is disposed.

10. The camera module of claim 9, wherein an upper end of the protrusion part includes a convex curved surface, and an upper end of the guide groove part has a '/\' shape.

11. The camera module of claim 8, wherein the lens unit includes a lens barrel accommodating at least one lens and a lens holder coupled with the lens barrel,
the lens holder includes an extension part extending toward the lifting member in the optical axis direction, and
the lifting member includes a pressure protrusion protruding toward the lens holder in the optical axis direction.

12. The camera module of claim 8, wherein the lens module further includes an elastic member elastically supporting the lens unit.

13. The camera module of claim 12, wherein the lens unit further includes an optical image stabilization (OIS) frame to which the guide holder is coupled, and the elastic member has one side coupled to the OIS frame and another side coupled to the lens unit.

14. The camera module of claim 13, wherein the OIS frame is accommodated in the carrier, and the lens unit is movable relative to the carrier in a direction perpendicular to the optical axis direction.

15. The camera module of claim 14, wherein a guide frame is disposed between the OIS frame and the carrier, a plurality of first ball members are disposed between the carrier and the guide frame, and a plurality of second ball members are disposed between the guide frame and the OIS frame.

16. The camera module of claim 14, further comprising:

a first driving unit including a first magnet disposed on the carrier and a first coil disposed to face the first magnet; and a second driving unit including second and third magnets disposed in the OIS frame, a second coil disposed to face the second magnet, and a third coil disposed to face the third magnet.

17. A mobile device, comprising:

a camera module comprising:

a housing having an inner space;

a carrier, disposed in the inner space, configured to move relative to the housing in a first direction;

a lens module accommodated in the carrier;

a guide housing coupled with the housing;

a lifting guide configured to move in a second direction with respect to the guide housing;

a lifting member, separate from the carrier, configured to move in the first direction, perpendicular to the second direction, along with a movement of the lifting guide in the second direction to selectively contact the lens module to press the lens module in the first direction or be spaced apart from the lens module; and a driving unit, coupled to drive the lifting guide, configured to drive the lifting guide, wherein the driving unit comprises a protrusion part disposed on one of the lifting guide and the driving unit, and a guide groove, elongated in the optical axis direction, coupled to the protrusion part and disposed in another of the lifting guide and the driving unit.

18. The mobile device of claim 17, wherein the lifting guide is further configured to rotate in the second direction with respect to the guide housing, and the first direction is in an optical axis direction.

* * * * *